US010198663B2

(12) United States Patent
Kawai et al.

(10) Patent No.: US 10,198,663 B2
(45) Date of Patent: Feb. 5, 2019

(54) SYSTEM FOR PREDICTING OCCURRENCE OF DEFECTIVE IMAGE AND PROGRAM FOR PREDICTING OCCURRENCE OF DEFECTIVE IMAGE

(71) Applicant: Konica Minolta, Inc., Tokyo (JP)

(72) Inventors: Natsuko Kawai, Hachioji (JP); Takashi Akazawa, Hachioji (JP); Tetsuya Ishikawa, Sagamihara (JP); Ryoei Ikari, Tokorozawa (JP); Kei Okamura, Yokohama (JP); Keiji Uchikawa, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 76 days.

(21) Appl. No.: 15/376,907

(22) Filed: Dec. 13, 2016

(65) Prior Publication Data

US 2017/0236036 A1 Aug. 17, 2017

(30) Foreign Application Priority Data

Feb. 16, 2016 (JP) .................................. 2016-026691

(51) Int. Cl.
  *G06K 9/62* (2006.01)
  *G06T 7/143* (2017.01)
  (Continued)

(52) U.S. Cl.
  CPC ......... *G06K 9/6212* (2013.01); *G06K 9/4642* (2013.01); *G06K 9/522* (2013.01);
  (Continued)

(58) Field of Classification Search
  CPC .... G06K 9/6212; G06K 9/4642; G06K 9/522; G06T 7/44; G06T 7/143;
  (Continued)

(56) References Cited

U.S. PATENT DOCUMENTS

| 6,443,550 B1 * | 9/2002 | Komiya | B41J 2/2132 |
| | | | 347/19 |
| 7,151,612 B2 * | 12/2006 | Mikami | B41J 29/393 |
| | | | 358/1.14 |
| 7,537,305 B2 * | 5/2009 | Chiwata | B41J 2/04508 |
| | | | 347/19 |

(Continued)

FOREIGN PATENT DOCUMENTS

| JP | S63-137251 A | 6/1988 |
| JP | H10-056570 A | 2/1998 |
| JP | 2012039424 A | 2/2012 |

*Primary Examiner* — Daniel G Mariam
(74) *Attorney, Agent, or Firm* — Lucas & Mercanti, LLP

(57) ABSTRACT

A system for predicting occurrence of a defective image includes: an input device configured to input image data into an image forming apparatus; and a hardware processor configured to analyze a spatial frequency of gradient distribution of an image in accordance with a size of a density irregularity specific to the image forming apparatus with respect to the input image data and to calculate a probability of a conspicuous density irregularity of the size in regard to the image formed by the image forming apparatus based on the image data with reference to an index of correlation between an analysis result and an evaluation value of the density irregularity.

20 Claims, 19 Drawing Sheets

(51) Int. Cl.
*G06T 7/11* (2017.01)
*G06T 7/168* (2017.01)
*G06K 9/46* (2006.01)
*G06K 9/52* (2006.01)
*G06T 7/00* (2017.01)
*G06T 7/42* (2017.01)
*G06T 7/44* (2017.01)

(52) U.S. Cl.
CPC .............. *G06T 7/0004* (2013.01); *G06T 7/11* (2017.01); *G06T 7/143* (2017.01); *G06T 7/168* (2017.01); *G06T 7/42* (2017.01); *G06T 7/44* (2017.01); *G06T 2207/20021* (2013.01); *G06T 2207/20056* (2013.01); *G06T 2207/20076* (2013.01); *G06T 2207/30144* (2013.01)

(58) Field of Classification Search
CPC ......... G06T 2207/20076; G06T 7/0004; G06T 7/11; G06T 7/42; G06T 7/168; G06T 2207/20021; G06T 2207/20056; G06T 2207/30144
USPC .................................................. 382/149, 170
See application file for complete search history.

(56) References Cited

U.S. PATENT DOCUMENTS 8,243,291 B2* 8/2012 Kojima ...................... B41J 2/01
347/1
8,849,134 B2* 9/2014 Ogawa ............... G03G 15/5058
358/1.9

* cited by examiner

SYSTEM FOR PREDICTING OCCURRENCE OF DEFECTIVE IMAGE AND PROGRAM FOR PREDICTING OCCURRENCE OF DEFECTIVE IMAGE

The entire disclosure of Japanese Patent Application No. 2016-026691 filed on Feb. 16, 2016 including description, claims, drawings, and abstract are incorporated herein by reference in its entirety.

BACKGROUND OF THE INVENTION

Field of the Invention

The present invention relates to a system for predicting occurrence of defective images which analyzes image data and predicts occurrence of a density irregularity specific to an image forming apparatus in regard to images formed by the image forming apparatus based on the image data, and relates to a program for predicting occurrence of the defective images.

Description of the Related Art

When an image is output by an image forming apparatus, there is a possibility that a density irregularity specific to the image forming apparatus occurs. An example of the specific density irregularity is a "firefly" which occurs circularly and is attributed to carrier particles of toner. Another example is a development-cyclic density irregularity which occurs in a belt-like shape and is attributed to deflection of a developing sleeve in a developing unit.

A level of each density irregularity depends on durability of the device or on environment and is constantly variable. In general, note that the level of each density irregularity varies extremely slowly and is almost uniform during continuous operation of the device.

When an image is printed by the image forming apparatus in which such a density irregularity occurs, the irregularity may be conspicuous or inconspicuous depending on a feature of an input image.

In a case where an image having a conspicuous density irregularity is printed, the image should be inspected and excluded by a detection device or operator as a defective image.

The inventions disclosed in JP 10-56570 A and JP 63-137251 A analyze image data in advance and then correct conditions of image forming processing.

The invention disclosed in JP 2012-39424 A reads out images from printouts and then carries out inspection processing. Herein, a speed of transmitting the printouts during readout is changed in accordance with inspection items.

The inventions disclosed in JP 10-56570 A and JP 63-137251 A satisfactorily adjust a feature of a gradient in accordance with image data so as to diminish defects in the gradient. However, those inventions do not include a unit for determining whether a density irregularity specific to an image forming apparatus is conspicuous to a human eye. Even though an image is printed with satisfactory gradient expression, there is a possibility that the density irregularity specific to the image forming apparatus occurs. Particularly because the image is printed with the satisfactory gradient expression, there is a possibility that the density irregularity specific to the image forming apparatus is conspicuous. Therefore, a problem of the density irregularity specific to the image forming apparatus may not be solved by the inventions disclosed in JP 10-56570 A and JP 63-137251 A.

In a case where the density irregularity is manually inspected, it is difficult to print and inspect simultaneously. Therefore, one hundred percent inspection is often carried out, which requires numerous man-hours. Accordingly, there is a demand on reducing printed materials to be inspected to a minimum.

A device for detecting printed materials disclosed in JP 2012-39424 A does not include a unit for predicting occurrence of defective images based on draft-image data of the printed materials. Therefore, such a device has no information for predicting on which printed material based on which draft-image data the defective images easily occur. Accordingly, there is no choice but to carry out one hundred percent inspection.

The device for detecting the printed materials disclosed in JP 2012-39424 A should properly set a threshold of the density irregularity for determining whether each image is the defective image. Otherwise, images having an inconspicuous density irregularity are determined as defective images, which leads to discarding the printed materials wastefully, or conversely, images having a conspicuous density irregularity are determined as non-defective images, which leads to shipping defective materials. Accordingly, there is a problem in accuracy of differentiating the non-defective materials from defective materials.

SUMMARY OF THE INVENTION

The present invention has been made in light of the abovementioned problems in the related art. An object of the present invention is to predict, based on image data, conspicuity of a density irregularity specific to an image forming apparatus which possibly occurs on images formed by the image forming apparatus based on the image data.

To achieve the abovementioned object, according to an aspect, a system for predicting occurrence of a defective image, reflecting one aspect of the present invention comprises:

an input device configured to input image data into an image forming apparatus; and a hardware processor configured to analyze a spatial frequency of gradient distribution of an image in accordance with a size of a density irregularity specific to the image forming apparatus with respect to the input image data and to calculate a probability of a conspicuous density irregularity of the size in regard to the image formed by the image forming apparatus based on the image data with reference to an index of correlation between an analysis result and an evaluation value of the density irregularity.

An invention of Item. 2 is the system for predicting occurrence of a defective image according to Item. 1, wherein, in analyzing the spatial frequency of the gradient distribution of the image in accordance with the size of the density irregularity specific to the image forming apparatus, the hardware processor preferably (1) replaces the density irregularity with circular gradient distribution according to two-dimensional Gaussian distribution and having a diameter equal to one cycle of the density irregularity, (2) carries out Fourier transform on image data, the image data being drawn with the Gaussian distribution of (1), so as to obtain a power spectrum of the spatial frequency of the circular gradient distribution, (3) extracts a frequency band ranging from where power is at a peak to where the power is at a predetermined value within the power spectrum of (2) except for a DC component or extracts the frequency at a peak, and (4) divides the image data to make regions of interest, each having a size fitting the Gaussian distribution of (1), calculates the power spectrum of the spatial frequency of gradient distribution by carrying out the Fourier transform on the whole divided regions of interest, and obtains a value F obtained by integrating the power by the frequency band extracted in (3) or a value F of the power at the frequency extracted in (3).

An invention of Item. 3 is the system for predicting occurrence of a defective image according to Item. 2, wherein the hardware processor preferably (5) determines that the density irregularity is inconspicuous when the value F of each region of interest in (4) is larger than a predetermined reference value, and (6) calculates the probability of the conspicuous density irregularity in the image formed by the image forming apparatus based on the image data by combining the determination of (5) in regard to each region of interest.

An invention of Item. 4 is the system for predicting occurrence of a defective image according to Item. 3, wherein the hardware processor preferably sets n/N as a probability P of the conspicuous density irregularity in the image formed by the image forming apparatus based on the image data, where N is a total number of the regions of interest, and n is the number of regions of interest whose density irregularity is determined to be conspicuous.

An invention of Item. 5 is the system for predicting occurrence of a defective image according to Item. 3, wherein the hardware processor preferably sets a mean value of pi of a total number N as the probability of the conspicuous density irregularity in the image formed by the image forming apparatus based on the image data, where N is the total number of the regions of interest, and pi is an expected probability of a conspicuous irregularity to be determined, the probability being set to pi =0 upon X−xi≤0 and pi=(X−xi)/X upon X−xi>0, where X is the reference value, and xi is the value F of an i-th region of interest.

An invention of Item. 6 is the system for predicting occurrence of a defective image according to Item. 1, wherein the hardware processor preferably displays a message recommending an inspection to a user upon determining the probability of the conspicuous density irregularity as being equal to or higher than a predetermined value.

An invention of Item. 7 is the system for predicting occurrence of a defective image according to Item. 1, wherein the hardware processor preferably instructs an image forming unit included in the image forming apparatus to correct a condition of image forming processing in order to diminish the density irregularity upon determining the probability of the conspicuous density irregularity as being equal to or higher than a predetermined value.

An invention of Item. 8 is the system for predicting occurrence of a defective image according to Item. 7, wherein the hardware processor preferably sets a correction amount of the condition of the image forming processing, instructed to the image forming unit, as a value closest to M×P among settable values, where P is the probability of the conspicuous density irregularity, and M is a maximum correction amount.

An invention of Item. 9 is the system for predicting occurrence of a defective image according to Item. 1, wherein, with respect to a plurality of density irregularities having different sizes, the hardware processor preferably analyzes the spatial frequency of the gradient distribution of the image in accordance with a size of each density irregularity and calculates each probability of the conspicuous density irregularity.

An invention of Item. 10 is the system for predicting occurrence of a defective image according to Item. 9, wherein, in instructing the image forming unit in the image forming apparatus to correct the condition of the image forming processing in order to diminish the density irregularities based on each probability of the conspicuous density irregularity, the hardware processor preferably gives priority to a density irregularity having a high probability of the conspicuous density irregularity among the plurality of density irregularities so as to instruct to correct the condition of the image forming processing.

An invention of Item. 11 is the system for predicting occurrence of a defective image according to Item. 1, wherein the hardware processor preferably outputs information of setting an inspection threshold of the density irregularity in accordance with the probability of the conspicuous density irregularity with respect to a density-irregularity detection system that detects the density irregularity relating to the image formed by the image forming apparatus.

An invention of Item. 12 is the system for predicting occurrence of a defective image according to Item. 2, wherein the hardware processor preferably calculates a luminance ratio $\Delta L/L$ corresponding to the value F per divided region of interest and gives feedback to a density-irregularity detection system that detects the density irregularity relating to the image formed by the image forming apparatus.

An invention of Item. 13 is the system for predicting occurrence of a defective image according to Item. 2, wherein the hardware processor preferably calculates a luminance ratio $\Delta L/L$ corresponding to the value F per divided region of interest and imparts, as an inspection threshold of the density irregularity, statistics such as a minimum value, mean value, and maximum value of a density difference corresponding to the luminance ratio $\Delta L/L$ to a density-irregularity detection system that detects the density irregularity relating to the image formed by the image forming apparatus.

To achieve the abovementioned object, according to an aspect, there is provided a non-transitory recording medium storing a computer readable program of a hardware processor included in an image forming apparatus, and the program reflecting one aspect of the present invention causes a computer to execute:

analyzing a spatial frequency of gradient distribution of an image in accordance with a size of a density irregularity specific to the image forming apparatus with respect to input image data; and calculating a probability of a conspicuous density irregularity of the size in regard to the image formed by the image forming apparatus based on the image data with reference to an index of correlation between an analysis result and an evaluation value of the density irregularity.

An invention of Item. 15 is the non-transitory recording medium storing a computer readable program according to Item. 14, the program preferably causing the computer to further execute, in analyzing the spatial frequency of the gradient distribution of the image in accordance with the size of the density irregularity specific to the image forming apparatus:

(1) replacing the density irregularity with circular gradient distribution according to two-dimensional Gaussian distribution and having a diameter equal to one cycle of the density irregularity;

(2) carrying out Fourier transform on image data, the image data being drawn with the Gaussian distribution of (1), so as to obtain a power spectrum of the spatial frequency of the circular gradient distribution;

(3) extracting a frequency band ranging from where power is at a peak to where the power is at a predetermined value within the power spectrum of (2) except for a DC component or extracting the frequency at a peak; and (4) dividing the image data to make regions of interest, each having a size fitting the Gaussian distribution of (1), calculating the power spectrum of the spatial frequency of the gradient distribution by carrying out the Fourier transform on the whole divided regions of interest, and obtaining a value F obtained by integrating the power by the frequency band extracted in (3) or a value F of the power at the frequency extracted in (3).

An invention of Item. 16 is the non-transitory recording medium storing a computer readable program according to Item. 15, the program preferably causing the computer to further execute:

(5) determining that the density irregularity is inconspicuous when the value F of each region of interest in (4) is larger than a predetermined reference value; and (6) calculating the probability of the conspicuous density irregularity in the image formed by the image forming apparatus based on the image data by combining the determination of (5) in regard to each region of interest.

An invention of Item. 17 is the non-transitory recording medium storing a computer readable program according to Item. 16, the program preferably causing the computer to further execute setting n/N as a probability P of the conspicuous density irregularity in the image formed by the image forming apparatus based on the image data, where N is a total number of the regions of interest, and n is the number of regions of interest whose density irregularity is determined to be conspicuous.

An invention of Item. 18 is the non-transitory recording medium storing a computer readable program according to Item. 16, the program preferably causing the computer to further execute setting a mean value of pi of a total number N as the probability of the conspicuous density irregularity in the image formed by the image forming apparatus based on the image data, where N is the total number of the regions of interest, and pi is an expected probability of a conspicuous irregularity to be determined, the probability being set to pi=0 upon X−xi≤0 and pi=(X−xi)/X upon X−xi>0, where X is the reference value, and xi is the value F of an i-th region of interest.

An invention of Item. 19 is the non-transitory recording medium storing a computer readable program according to Item. 14, the program preferably causing the computer to further execute instructing to display a message recommending an inspection to a user upon determining the probability of the conspicuous density irregularity as being equal to or higher than a predetermined value.

An invention of Item. 20 is the non-transitory recording medium storing a computer readable program according to Item. 14, the program preferably causing the computer to further execute instructing an image forming unit included in the image forming apparatus to correct a condition of image forming processing in order to diminish the density irregularity upon determining the probability of the conspicuous density irregularity as being equal to or higher than a predetermined value.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 24B illustrates calculation of an integrated value F;

DESCRIPTION OF THE PREFERRED EMBODIMENTS

Figure 1A:
FIG. 1A is a schematic view illustrating a concept of substituting circular gradient distribution for a belt-like irregularity to explain an embodiment of the present invention.

Hereinafter, an embodiment of the present invention will be described with reference to the drawings. However, the scope of the invention is not limited to the illustrated examples.

[Summary of System]

A system for predicting occurrence of defective images analyzes a spatial frequency of gradient distribution of each image in accordance with a size of a density irregularity specific to an image forming apparatus with respect to image data input to the image forming apparatus as a draft. The system then calculates a probability of a conspicuous density irregularity of the size in regard to each image formed by the image forming apparatus based on the image data. Such calculation is carried out with reference to an index of correlation between an analysis result and an evaluation value of the density irregularity. Herein, the index of correlation may be represented by any form such as a data table and correlation formula.

The image forming apparatus includes a draft input device (a device for inputting image data and a unit for reading out a paper draft) and an image forming unit. The image forming unit develops with toner an electrostatic latent image formed on a photoreceptor based on the image data so as to form a toner image. The image forming unit then transcripts the formed toner image to a sheet and heats the transcribed toner image so as to fix the toner image and to form an image on the sheet.

A computer program for achieving performance of the system is installed in a computer included in the image forming apparatus or in an external computer. Such a computer program is included in the present system. In order to achieve the performance of the present system by the external computer, note that the system analyzes the image data before input of the image data to the image forming apparatus as a draft, or during input of the same, or after input of the same and before formation of an image. The system then calculates a probability when the draft is input to the image forming apparatus and the image is formed.

Furthermore, a density-irregularity detector included in a density-irregularity detection system is attached to the image forming apparatus so as to link the system with the density-irregularity detection system. The density-irregularity detector includes a readout unit for reading out the image formed by the image forming apparatus.

In order to analyze the spatial frequency of the gradient distribution of each image in accordance with the size of the density irregularity specific to the abovementioned image forming apparatus, (1) first, the density irregularity is replaced by circular gradient distribution 101 according to two-dimensional Gaussian distribution and having a diameter equal to one cycle of the density irregularity.

With regard to a density irregularity occurring circularly, a diameter thereof is equal to one cycle so that it is replaced by the circular gradient distribution 101 according to the two-dimensional Gaussian distribution and having the diameter equal to the diameter of the density irregularity.

As illustrated in FIG. 1A, a belt-like irregularity 102 approximates a consecutive irregularity 103 in which circular irregularities are overlapping. Furthermore, the irregularity 102 partially approximates one circular irregularity. Therefore, the belt-like irregularity 102 is also replaced by the circular gradient distribution 101 according to the two-dimensional Gaussian distribution and having the diameter equal to one cycle of the density irregularity. Due to such replacement, even though the belt-like irregularity such as a development-cyclic density irregularity occurs, it is possible to calculate that in which part of an image the irregularity becomes conspicuous.

Figure 1B:
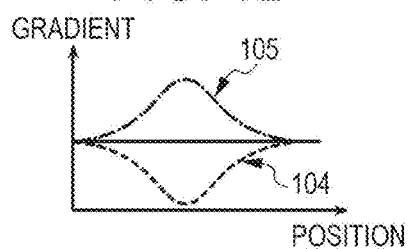
FIG. 1B is a graph illustrating the circular gradient distribution.

The replacing circular gradient distribution 101 may be shaped as a graph 104 protruding downward or as a graph 105 protruding upward in a graph illustrated in FIG. 1B, where a position is taken along the abscissa and a gradient is taken along the ordinate.

(2) Image data which the Gaussian distribution of (1) is drawn on is subject to Fourier transform so as to obtain a power spectrum of a spatial frequency of the circular gradient distribution 101.

Figure 1C:
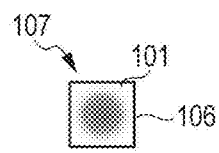
FIG. 1C is a view illustrating a square image surrounding the circular gradient distribution.

Herein, an image 107 is subject to the Fourier transform. As illustrated in FIG. 1C, the image 107 includes a region, that is, a square 106 having a side equal to one cycle of the density irregularity to be determined. A peak of the Gaussian distribution is drawn on a middle of the image 107.

Figure 1D:
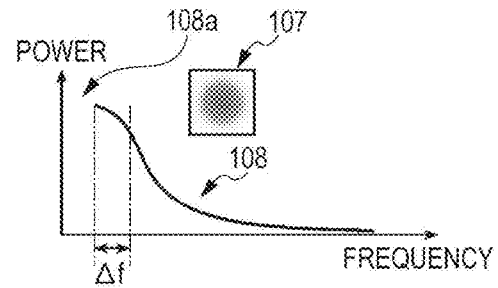
FIG. 1D is a graph illustrating the square image and a power spectrum of the same.

(3) Within the power spectrum described in (2), a frequency band ranging from where power is at a peak to where the power is at a predetermined value is extracted except for a DC component. (Alternatively, the frequency at the peak is extracted). As illustrated in FIG. 1D, a power spectrum 108 of the image 107 can be obtained. Accordingly, for example, a frequency band $\Delta f$ ranging from where the power is at the peak to where the power is at the predetermined value is extracted except for a frequency band 108a. The frequency band 108a herein is largely affected by the DC component having a frequency close to zero. (Alternatively, the frequency at the peak is extracted). Alternatively, the frequency band 108a in which the frequency is close to zero may be included in a case where the DC component is excluded from the power spectrum 108.

Figure 1E:
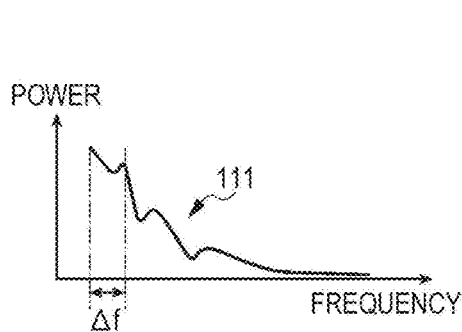
FIG. 1E is a graph illustrating an exemplary power spectrum of a region of interest of draft-image data.
Figure 1F:
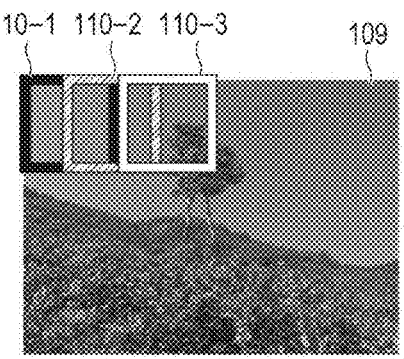
FIG. 1F is a view illustrating that the draft-image data is divided into regions of interest.

(4) The image data input from the draft input device (an image of such image data is, for example, an image 109 illustrated in FIG. 1F) is divided into sizes in which the Gaussian distribution of (1) can be fit (each size corresponding to the square 106) as illustrated in FIG. 1F. The divided image data are referred to as regions of interest 110 (110-1, 110-2, 110-3, ... ). With respect to the whole divided regions of interest, each power spectrum of the spatial frequency of the gradient distribution is calculated by the Fourier transform (for example, each power spectrum is calculated as similar to a power spectrum 111 illustrated in FIG. 1E) so as to obtain a value F obtained by integrating the power by the frequency band $\Delta f$ extracted in (3). (Alternatively, a value F of the power at a time when the frequency is extracted in (3) is obtained).

(5) In a case where the value F of each region of interest described in (4) is larger than a predetermined reference value, the density irregularity is determined to be inconspicuous.

(5.1)
The reference value corresponds to the density irregularity specific to the image forming apparatus and is measured in advance. The reference value is obtained from a correlation table 201 as illustrated in FIG. 2A obtained by a psychophysical experiment.

Figure 2A:
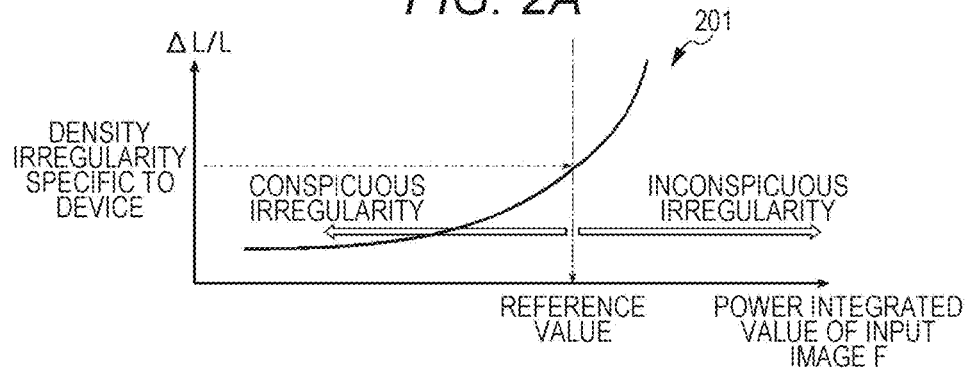
FIG. 2A is a graph illustrating correlation between an analysis result (power integrated value of the draft-image data) and an evaluation value of a density irregularity (luminance ratio) in order to explain an embodiment of the present invention.

In the correlation table 201, a luminance ratio $\Delta L/L$ representing visibility of the density irregularity is taken along the ordinate, while a power integrated value F of each region of interest is taken along the abscissa as illustrated in FIG. 2A.

Herein, with respect to the density irregularity occurring in a background image having predetermined gradient distribution, $\Delta L$ is a value obtained by converting, into a difference of luminance, a difference between a peak gradient and a background gradient of the density irregularity having the minimum intensity visible to subjects in the psychophysical experiment carried out in advance. L is a value obtained by converting the background gradient into luminance (FIGS. 2B, 2C).

Figure 2B:
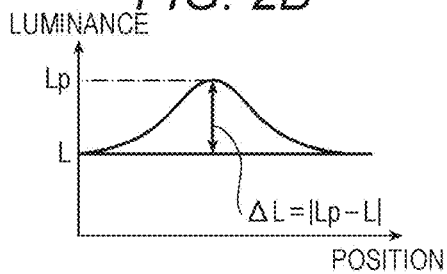
FIGS. 2B and 2C are graphs illustrating gradient distribution of density-irregularity models used in a psychophysical experiment to make a table for the correlation.
Figure 2C:
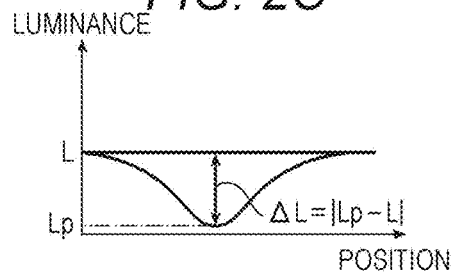

In the experiment for making the correlation table 201, luminance distribution of the density irregularity in a graph in which the position is taken along the abscissa and the luminance is taken along the ordinate may be projected upward as illustrated in FIG. 2B or projected downward as illustrated in FIG. 2C.

The luminance ratio $\Delta L/L$ which is to be a border between whether the density irregularity is conspicuous or inconspicuous, or a color difference is set in advance to a randomly selected value. Based on the correlation table 201, a power integrated value F corresponding to the luminance ration or color difference (reference value) is set to be a reference value for determining the density irregularity based on the correlation table 201.

(5.2) In stabilizing and adjusting the image forming apparatus, a density difference of an actually-occurring density irregularity is measured and the density difference is converted into a luminance ratio corresponding to the correlation table 201. The converting luminance ratio is referred as a value corresponding to the density irregularity specific to the image forming apparatus and a reference value of this value is obtained and is hereinafter used.

(5.3) The luminance ratios $\Delta L/L$ in (5.1) and (5.2) may be replaced by a color difference $\Delta E^*ab$ or $\Delta E00$.

(5.4) Furthermore, each of the luminance ratios $\Delta L/L$ in (5.1) and (5.2) may be a subjective evaluation value obtained by obtaining conspicuity of the density irregularity by a magnitude evaluation method. The reason is to improve accuracy of a correlation formula for determining the conspicuity of the density irregularity. Herein, a formula representing correlation between the subjective evaluation value and power integrated value F is preferably a logarithm approximate formula so as to obtain satisfactory accuracy.

Herein, the subjective evaluation value obtained by obtaining the conspicuity of the density irregularity by the magnitude evaluation method is a value rated in accordance with the following criteria as the subjects observing the density irregularity. Such a value is referred to as an "impression rank" in this description.

The criteria are (0/cannot be recognized as an irregularity), (1/can be recognized as an irregularity but not annoying), (2/slightly annoying), (3/annoying), (4/ seriously annoying), represented by (impression rank/determination criterion). The impression rank maybe rated per 0.1.

(5.5) In a case of using the impression rank, the correlation formula between the power integrated value F and conspicuity of the density irregularity may be changed depending on a density difference of the density irregularity to be determined.

Figure 2D:
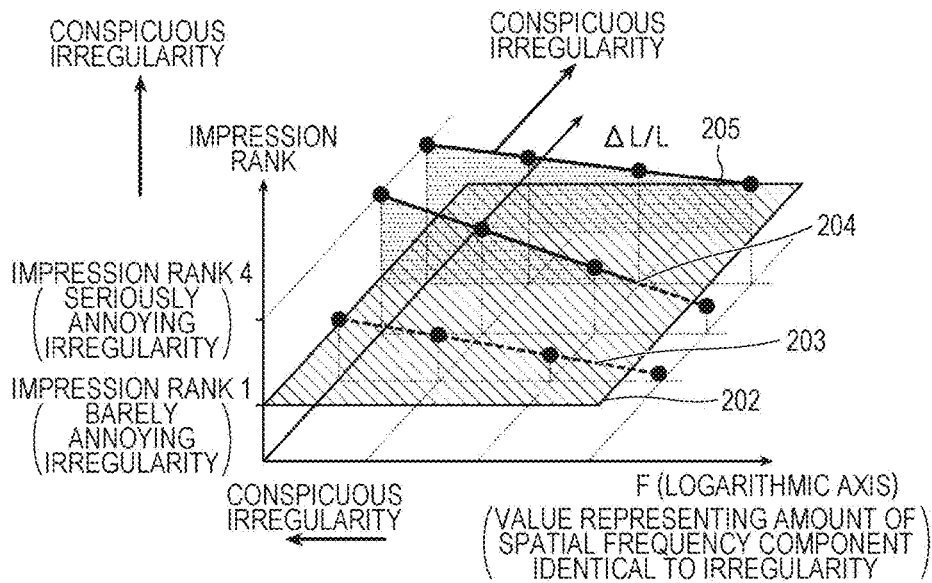
FIG. 2D is a graph illustrating the correlation between the analysis result (power integrated value of the draft-image data) and the evaluation value of the density irregularity (impression rank) per value obtained by converting a density difference between a central and vicinal portion of each density-irregularity portion into the luminance ratio.

In other words, L represents a value in which density to be measured is converted into the luminance, and $\Delta L/L$ represents a value obtained by converting a density difference between a central and vicinal portion of a density-irregularity portion into a luminance ratio. Therefore, by using the "impression rank", it is possible to make correlation as illustrated in FIG. 2D.

The integrated value F represents an amount of a spatial frequency component equal to that of the irregularity. The smaller the integrated value F, the more the density irregularity becomes conspicuous as illustrated in FIG. 2D. On the other hand, ΔL/L is the value obtained by converting the density difference between the central and vicinal portion of the density-irregularity portion to be determined into the luminance ratio. When the value ΔL/L is small, the density irregularity is rated as equal to or less than the impression rank "1", and when the value ΔL/L is large, the density irregularity is rated as exceeding the impression rank "1" (higher than a plane 202 in the graph illustrated in FIG. 2D). In such manners, by changing correlation formulae (203, 204, 205 . . . ) to be applied depending on the value ΔL/L of the density irregularity, it is possible to improve accuracy of predicting the conspicuity of the density irregularity.

(6) Combining the determination of (5) in regard to each region of interest, the probability of the conspicuous density irregularity is calculated with respect to each image formed by the image forming apparatus based on the image data.

(6.1) An example of the probability of the conspicuous density irregularity in each image formed by the image forming apparatus based on the image data is represented by P which is obtained by n/N, where N is a total number of the regions of interest, and n is the number of regions of interest whose density irregularity is determined to be conspicuous.

(6.2) Another example of the probability of the conspicuous density irregularity in each image formed by the image forming apparatus based on the image data is represented by a mean value of pi of a total number N, according to the Formula (1), where N is the total number of the regions of interest, and pi is an expected probability of the conspicuous irregularity to be determined which is set to be equal to zero when X−xi≤0 and set to be equal to (X−xi)/X when X−xi>0, where X is the reference value, and xi is a power integrated value F of an i-th region of interest.

[Mathematical Formula 1]

$$\Sigma_{i=1}^{N}(pi)/N=P \quad \text{Formula (1)}$$

(7.1) When the probability of the conspicuous density irregularity calculated in such manners is determined to be equal to or higher than a predetermined value, a message recommending an inspection is displayed to a user. A position where the message is displayed is, for example, an operating panel of the image forming apparatus, and a timing when the message is displayed is when forming an image of image data whose probability of the conspicuous density irregularity is determined to be equal to or higher than the predetermined value.

(7.2) Furthermore, when the probability of the conspicuous density irregularity calculated in such manners is determined to be equal to or higher than the predetermined value, the image forming unit in the image forming apparatus is instructed to correct conditions of image forming processing in order to diminish the density irregularity.

(7.2.1) In such a case, a correction amount of the conditions of the image forming processing instructed to the image forming unit is set to be a value closest to M×P among settable values, where P is the probability of the conspicuous density irregularity, and M is a maximum correction amount.

(7.3) In a case where a plurality of density irregularities, having different sizes, such as the abovementioned "firefly" and development-cyclic density irregularity is the density irregularity specific to the image forming apparatus, a spatial frequency of gradient distribution of each image is analyzed in accordance with the size of each density irregularity with respect to the plurality of density irregularities having the different sizes so as to calculate each probability of the conspicuous density irregularity.

(7.3.1) In instructing the image forming unit in the image forming apparatus to correct the conditions of the image forming processing in order to diminish the density irregularity based on each probability of the conspicuous density irregularity, priority is given to a density irregularity having a higher probability of the conspicuous density irregularity among the plurality of density irregularities, and correction of the conditions of the image forming processing is instructed. For example, instructed are conditions of the image forming processing advantageous to diminish the density irregularity having the higher probability of the conspicuous density irregularity between the "firefly" and development-cyclic density irregularity.

(7.4) Information of setting a threshold for inspecting the density irregularity is output in accordance with the probability of the conspicuous density irregularity with respect to the density-irregularity detection system for detecting the density irregularity in each image formed by the image forming apparatus.

(7.4.1) The luminance ratio ΔL/L corresponding to the integrated value F is calculated per divided region of interest 110 (110-1, 110-2, 110-3, . . . ). In regard to each image formed by the image forming apparatus, feedback of the luminance ratio is given to the density-irregularity detection system which detects the density irregularity. The density-irregularity detection system sets the threshold for inspecting the density irregularity based on the luminance ratio ΔL/L.

(7.4.2) The luminance ratio ΔL/L corresponding to the integrated value F is calculated per divided region of interest 110 (110-1, 110-2, 110-3, . . . ) and statistics such as a minimum value, mean value, and maximum value of the density difference corresponding to the luminance ratio ΔL/L is imparted to the density-irregularity detection system for detecting the density irregularity relating to each image formed by the image forming apparatus as the inspection threshold of the density irregularity. The density-irregularity detection system sets the statistic as the threshold for inspecting the density irregularity.

EXAMPLES, COMPARATIVE EXAMPLES (8) Hereinafter, the present system will be described by referring to the following Examples and comparing with the following Comparative Examples.

(8.1) The following is a common condition shared by the whole Examples and Comparative Examples.

Conditions described in Examples and Comparative Examples will be applied to an electrophotographic and two-component-development type image forming apparatus.

(8.2) A method for making the correlation table between the luminance ratio ΔL/L and power integrated value F will be described.

The following experiment and analysis will be carried out in order to obtain the correlation formula between the density irregularity and the feature of the input image (spatial frequency component of gradient distribution) and to make the correlation table between ΔL/L and F.

(8.2.1) Summary

An experiment is carried out in such a way that subjects are presented with images including a luminance irregularity, assumed to be the density irregularity, output by the image forming apparatus. The subjects are then asked to report whether the luminance irregularity is visible.

Based on the experiment, ΔL/L is recorded and F is calculated based on analysis of the presentation images so as to obtain the correlation view between ΔL/L and F.

(8.2.2) Experimental Conditions

Subject: nine persons (all were free from any visual impairments) (any number of subjects may be applicable) Circumstance: darkroom Method for presenting the images: a method of ascending limits (one of the fundamental methods of psychophysical experiments in order to obtain the smallest detectable intensity of a target stimulus by gradually increasing the intensity of the stimulus observed by a subject, in short, to obtain a threshold) Conditions of the presentation images: a distance between each image and each subject was set to be 50 cm. The head of each subject was not fixed. A time for presenting each image was set to be four seconds. A background of each image was a grayscale natural-scene image. Two images which were 170 long×236 wide (mm$^2$) (visual field at 19° high×27° wide) were arranged in front of each subject within a visual field at approximately 50° (478 mm wide). The density irregularity (target stimulus) herein was a circular Gaussian stimulus. A visual angle of a diameter was set to be approximately 1° and a central color was black (darker than an original image). There were 192 ways prepared for the presentation images. A presentation media applied herein was a display (Maker/model specification: EIZO/ColorEdgeCG221, maximum luminance: 80 cd/m2).

(8.2.3) Experimental Procedures

Figure 3:
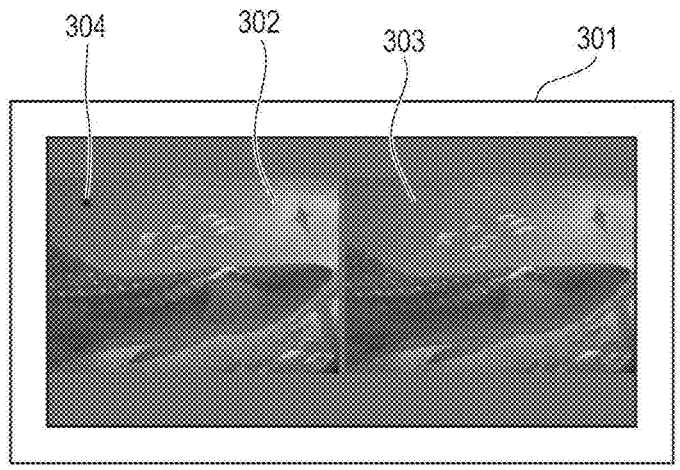
FIG. 3 is a view illustrating exemplary presentation images used in the psychophysical experiment.

As illustrated in FIG. 3, the presentation images applied herein were natural-scene images and two identical images were presented in a row. The images were displayed on a display 301.

One of the images was an original image 303 having no luminance irregularity (an input image formed by the image forming apparatus), and the other was an image 302 having a circular luminance irregularity 304 intentionally drawn on an image identical to the original image. The luminance irregularity 304 was drawn in accordance with the Gaussian distribution.

Arrangement of the image 302 having the irregularity and the original image 303 having no irregularity was randomly determined every time those images were changed.

Each subject was asked to compare the images 302 and 303 in right and left for four seconds. Once he/she found the luminance irregularity, the experiment was completed.

In a case where he/she could not find the luminance irregularity, the images were automatically changed to images including a luminance irregularity having stronger intensity. The subject then looked for the luminance irregularity again.

Figure 4:
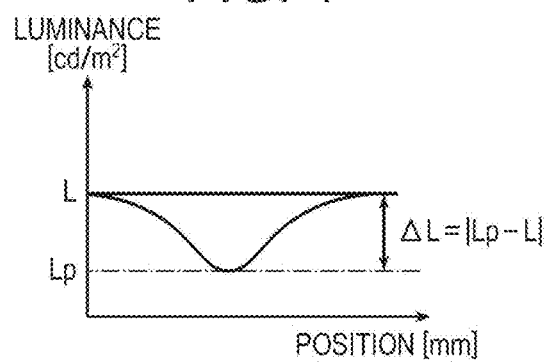
FIG. 4 is a graph illustrating gradient distribution of a density-irregularity model in the psychophysical experiment using the presentation images illustrated in FIG. 3.

The intensity of the luminance irregularity was gradually increased from a state in which contrast between the luminance irregularity and the background is small. Luminance contrast at a time when each subject visually confirmed the luminance irregularity for the first time was recorded as ΔL/L. ΔL/L herein is a value corresponding to visibility of the irregularity. The larger value indicates that the irregularity is less conspicuous. Herein, as illustrated in FIG. 4, L represents mean luminance of the background image, while ΔL represents a difference between the mean luminance L and a peak of luminance distribution of the density irregularity having the lowest intensity visible to each subject.

Figure 5:
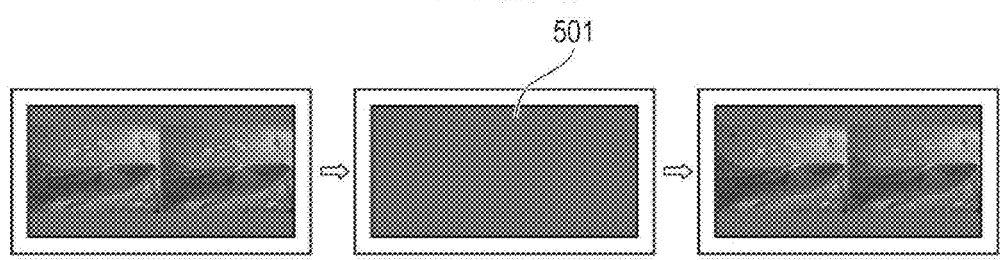
FIG. 5 is a schematic view illustrating a change of the presentation images in the psychophysical experiment using the presentation images illustrated in FIG. 3.

As illustrated in FIG. 5, when changing the presentation images to the images having stronger intensity, a uniform gray image 501 was presented for one second as an interval. The reason for presenting the interval is that a human visual system is sensitive to time variation of stimulus light.

Therefore, in a case where the intensity of the irregularity is changed without any interval, the conspicuity of the irregularity in a static image cannot be measured accurately.

(8.2.4) Analytic Procedures

Figure 6:
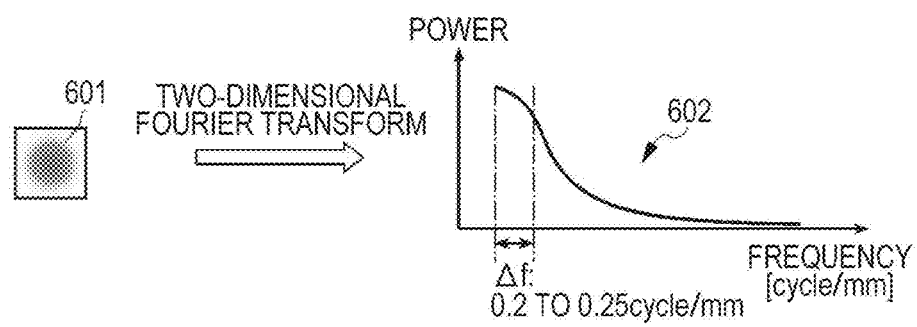
FIG. 6 is a view illustrating an image of a luminance irregularity drawn on one presentation image presented in the psychophysical experiment using the presentation images illustrated in FIG. 3 and illustrating a power spectrum of the luminance irregularity.

As illustrated in FIG. 6, the luminance irregularity drawn on one experimental presentation image was drawn on an image with uniform gradient (a white background with an 8-bit grayscale and gradient 255) and the image was cut into a square having a side equivalent to a diameter of the irregularity. The two-dimensional Fourier transform was carried out on a cutoff image 601. Then, a power spectrum 602 of a spatial frequency of gradient distribution of the image 601 was calculated.

Within the obtained power spectrum 602, a frequency band representing a feature of the irregularity was selected except for a frequency band largely affected by the DC component. Specifically, extracted was a frequency band Δf ranging from 0.25 [cycle/mm] frequency to 0.2 [cycle/mm] frequency. The 0.25 [cycle/mm] frequency was where power became 80% of the power at 0.2 [cycle/mm] frequency.

Figure 7:
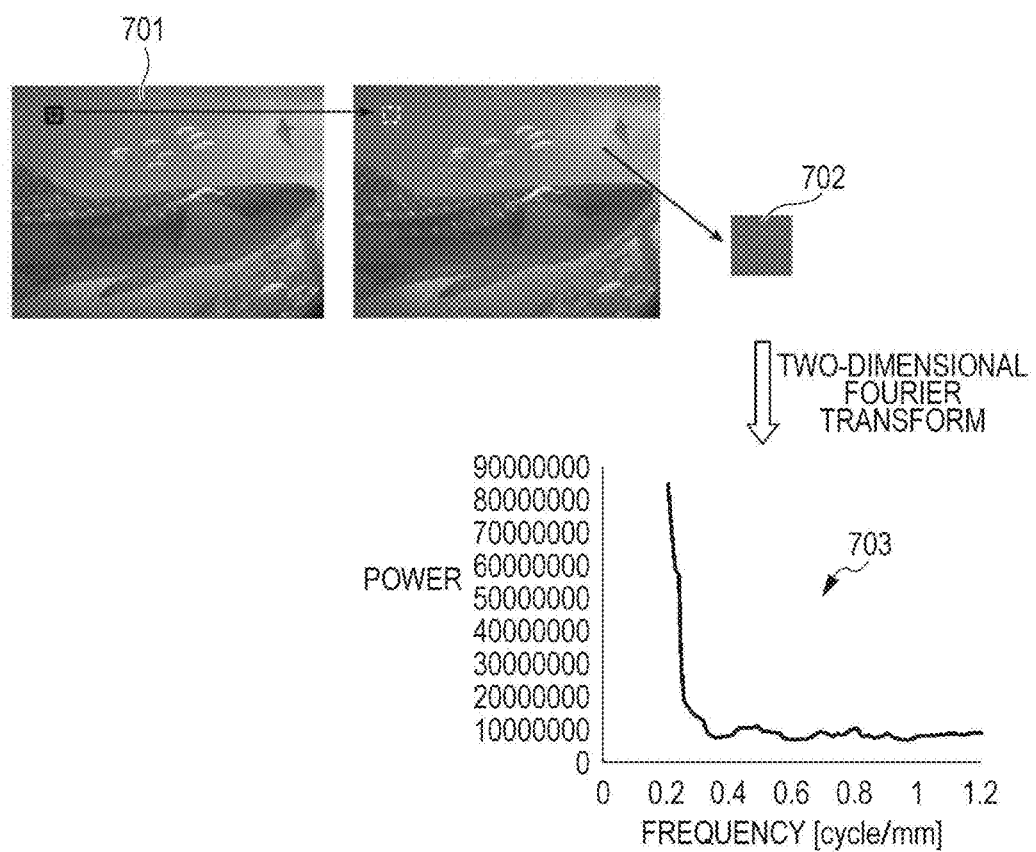
FIG. 7 is a schematic view for explaining procedures of calculating a power spectrum of a region including the image of the luminance irregularity of the presentation image presented in the psychophysical experiment using the presentation images illustrated in FIG. 3 (excluding the image of the luminance irregularity)

On the other hand, as illustrated in FIG. 7, in each image (for example, an image 701) presented in the experiment, background image (original image) data having no irregularity was cut off to a size identical to the size during the aforementioned analysis. The image data was cut off at a position where the luminance irregularity was drawn. A cutoff image 702 was subject to the two-dimensional Fourier transform so as to obtain a power spectrum 703 of a spatial frequency of gradient distribution of the image 702.

Figure 8A:
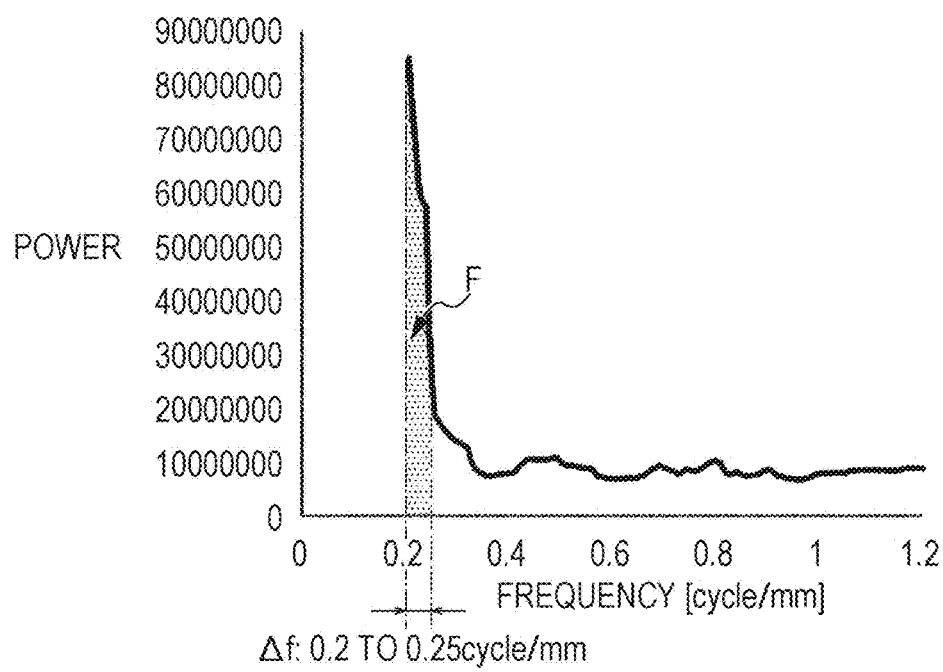
FIG. 8A is a view illustrating an example of calculating an integrated value from the power spectrum illustrated in FIG. 7.

Based on the power spectrum 703 obtained herein, a value F obtained by integrating the power by the frequency band Δf was calculated as illustrated in FIG. 8A.

Note that the larger value F indicates that the image includes the spatial frequency component identical to the irregularity.

Figure 8B:
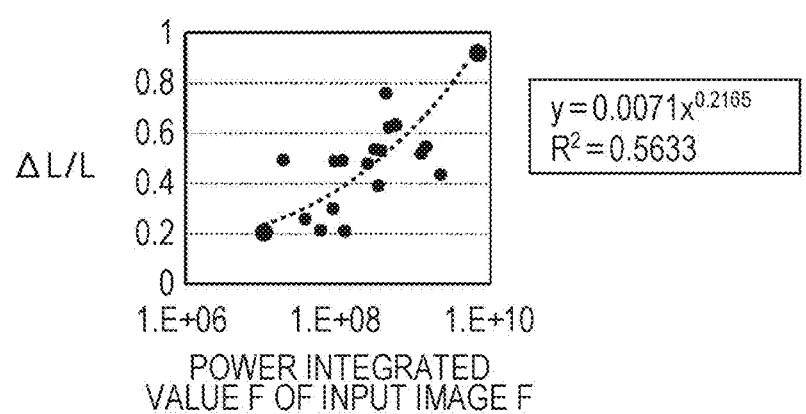
FIG. 8B is a correlation view of the luminance ratio and integrated value.

In such manners, the integrated value F per presentation image used for the experiment was calculated. By using the value of an experimental result ΔL/L obtained from each image, the correlation view between the luminance ratio ΔL/L and integrated value F was drawn as illustrated in FIG. 8B. The results plotted to the correlation view was approximated so as to obtain a correlation formula R(F). In the present Example, R(F) was equal to ΔL/L=0.0071 $F^{0.2165}$.

This correlation formula R (F) was referred to as an original correlation table between the luminance ratio ΔL/L and integrated value F. A specific numerical value of the correlation table was set by adjusting the original correlation formula to a specification of the image forming apparatus provided with the system for predicting occurrence of the defective images according to an embodiment of the present invention.

(8.3) Method for Converting Density Difference into Luminance Ratio ΔL/L

Figure 9A:
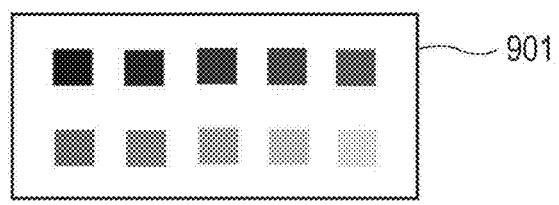
FIG. 9A is a schematic view of an image sample used in a method for converting the density difference into the luminance ratio.

Before providing the image forming apparatus with the system for predicting occurrence of the defective images according to an embodiment of the present invention, an image sample 901 in which a plurality of patches having different gradients was drawn on a white background and was output on a sheet as illustrated in FIG. 9A. By using the image sample 901, density of the white background and of each patch portion and luminance of reflected light at positions identical to the white background and each patch portion were measured. Based on the correlation formula obtained from measurement results, the density and luminance were mutually converted.

Figure 9B:
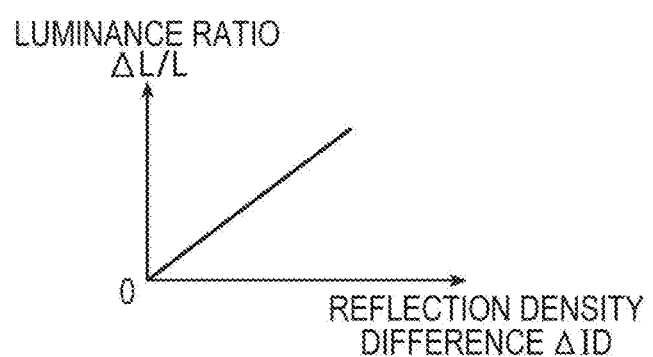
FIG. 9B is a graph illustrating a correlation between the density difference and luminance ratio.

In the present Example, by using FD-7 (made by Konica Minolta, Inc.) as a densitometer and CS-100 (made by Konica Minolta, Inc.) as a luminance measurement device, obtained was a correlation between a density difference ΔID of the white background and each patch portion, and the luminance ratio ΔL/L as illustrated in FIG. 9B. The gradient of each patch was made into five steps from 100 to 10% per 10% based on ΔL =|Lp−L|, L representing the luminance of the reflected light of the white background, and Lp representing the luminance of each patch portion.

(8.3) Example 1

Example 1 is an example in which the present invention is applied to a sleeve-cyclic density irregularity which occurs due to deflection of a developing sleeve in the electrophotographic image forming apparatus.

Figure 10:
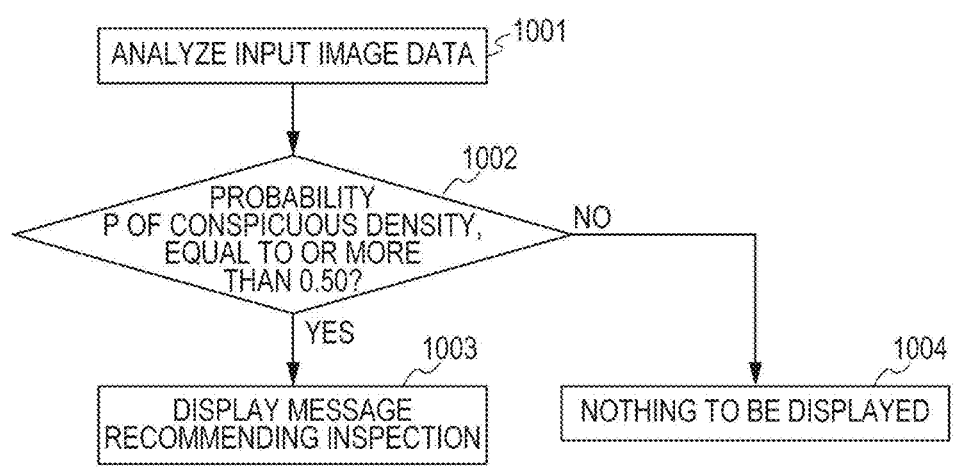
FIG. 10 is a flowchart illustrating an algorithm of displaying a message recommending an inspection according to Example 1 of the present invention.

An algorithm of displaying the message recommending the inspection applied in Example 1 is illustrated in FIG. 10.

(8.3.1) Method for Calculating Probability of Conspicuous Density Irregularity (Conditions)

A value obtained by converting the density difference of the density irregularity occurring in the image forming apparatus into the luminance ratio ΔL/L was set to be 0.13.

A reference value of the power integrated value F of the input image corresponding to ΔL/L was set to be 620186 based on the aforementioned correlation formula R(F).

Figure 11:
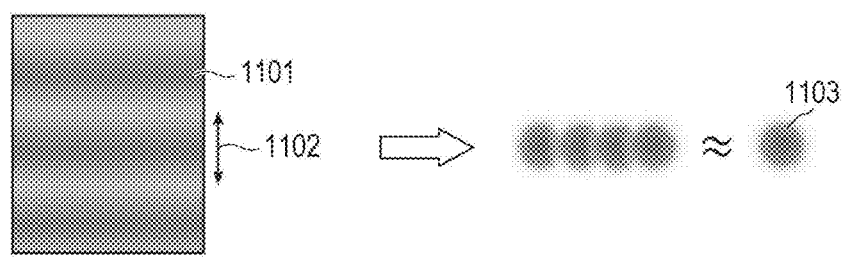
FIG. 11 is a schematic view illustrating a concept of substituting circular gradient distribution for a belt-like irregularity in Example 1 of the present invention.

A cycle 1102 of a density irregularity (sleeve-cyclic density irregularity) 1101 to be determined as illustrated in FIG. 11 was set to be 44 mm.

The sleeve-cyclic density irregularity 1101 was replaced by a circular density irregularity 1103 having a diameter of 44 mm in which gradient distribution thereof became equal to the Gaussian distribution as illustrated in FIG. 11. Then, the following procedures were carried out.

(Procedures)

(a) Input image data was divided into a square having a side of 44 mm in length.

Figure 12:
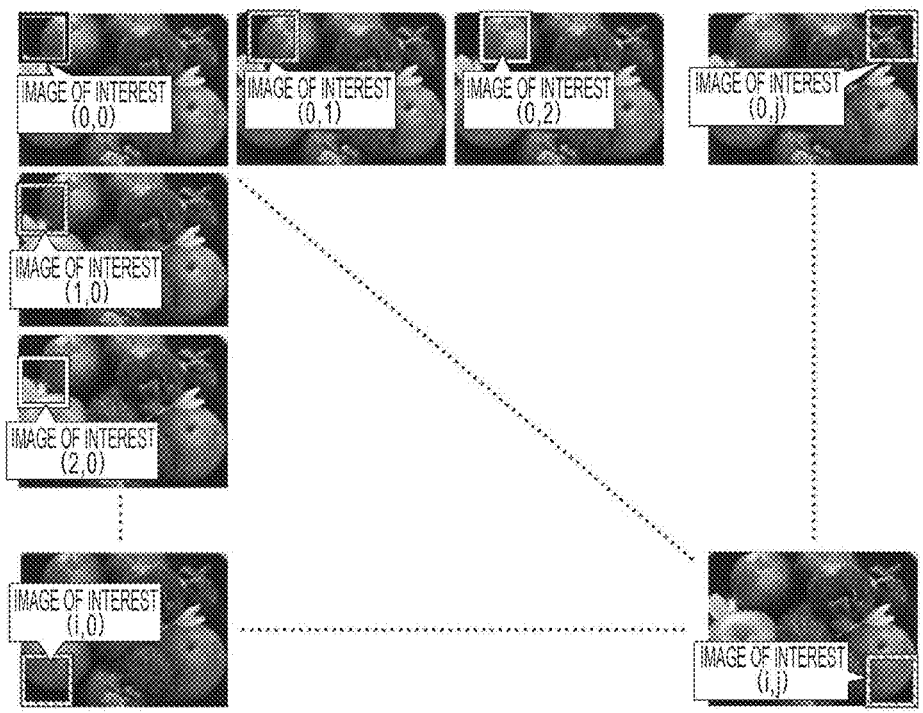
FIG. 12 is a schematic view illustrating that draft-image data is divided into regions of interest in Example 1 of the present invention.

(b) The divided image was referred to as a region of interest as illustrated in FIG. 12. The region of interest was shifted per one pixel.

(c) In regard to an image of each divided region of interest, a size of the image was expanded or contracted so that the image size would have a pixel number equal to that of the image size when the correlation formula R(F) was derived by the aforementioned method. (d) The two-dimensional Fourier transform was carried out on the expanded or contracted image of each region of interest so as to obtain a power spectrum.

(e) A value F was obtained by integrating the power spectrum by a frequency band similar to one at a time when the aforementioned R(F) was obtained.

Figure 13:
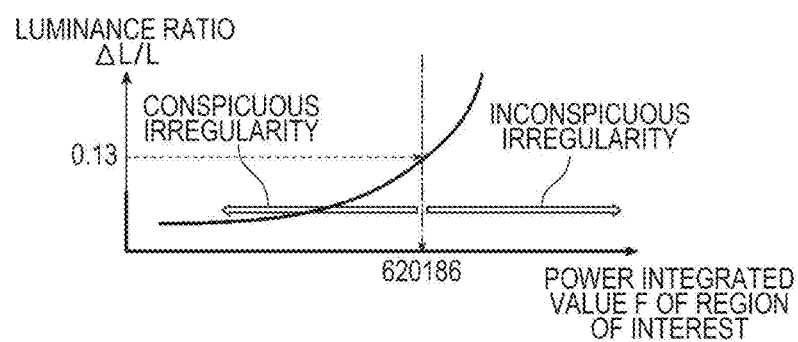
FIG. 13 is a graph illustrating correlation between an analysis result (power integrated value of draft-image data) and an evaluation value of a density irregularity (luminance ratio) in Example 1 of the present invention.

(f) As illustrated in FIG. 13, when 620186≤F, the image of each region of interest was determined as an image having an "inconspicuous irregularity", and when F<620186, determined as an image having an "conspicuous irregularity."

(g) A probability P of the conspicuous density irregularity when outputting the input image was represented by n/N, n representing the number of regions of interest whose irregularity was determined to be conspicuous, and N representing the number of the whole regions of interest. ((a) to (g): Step 1001 in FIG. 10).

(h) When the probability P was equal to or more than 0.50, the message recommending the inspection was set to be displayed (YES at Step 1002 in FIG. 10—NO at Step 1003, Step 1002→Step 1004). A threshold herein may be set randomly.

(8.4) Example 2

Similar to Example 1, Example 2 is an example in which the present invention is applied to a development-cyclic density irregularity which occurs due to deflection of the developing sleeve in the electrophotographic image forming apparatus.

Figure 14A:
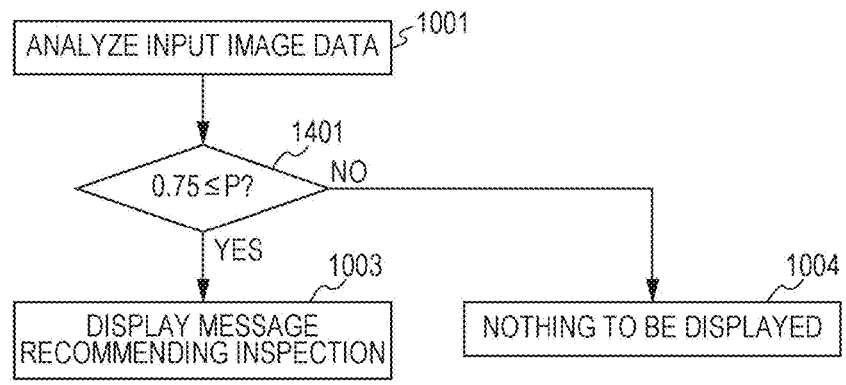
FIG. 14A is a flowchart illustrating an algorithm of displaying the message recommending the inspection according to Example 2 of the present invention.

An algorithm of displaying the message recommending the inspection adopted in Example 2 is illustrated in FIG. 14A. An algorithm of correcting developing conditions in accordance with the probability of the conspicuous density irregularity is illustrated in FIG. 14B.

Figure 14B:
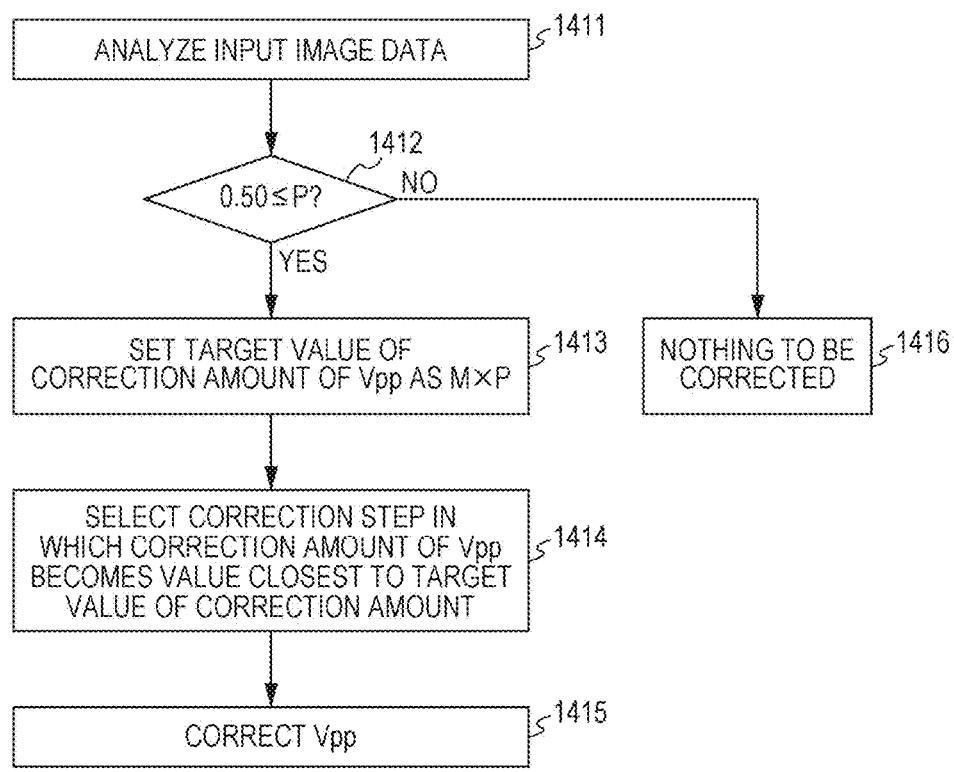
FIG. 14B is a flowchart illustrating an algorithm of correcting developing conditions in accordance with a probability of a conspicuous density irregularity.

In FIGS. 14A and 14B, Vpp represents a peak value of developing AC bias, P represents the probability of the conspicuous density irregularity, and M represents the maximum correction amount of Vpp.

(8.4.1) Method for Calculating Probability of Conspicuous Density Irregularity (Conditions)

Conditions herein conformed to the conditions in Example 1.

(Procedures)

The procedures until obtaining the integrated value F of the power spectrum was similar to the procedures in Example 1.

After obtaining the power integrated value F, the probability of the conspicuous density irregularity was calculated by the following procedures. A power integrated value F of an i-th region of interest was represented by xi.

A reference value of the integrated value F corresponding to ΔL/L was represented by X (herein, conditions were similar to Example 1 so that ΔL/L was equal to 0.13, and X was equal to 620186).

Figure 15:
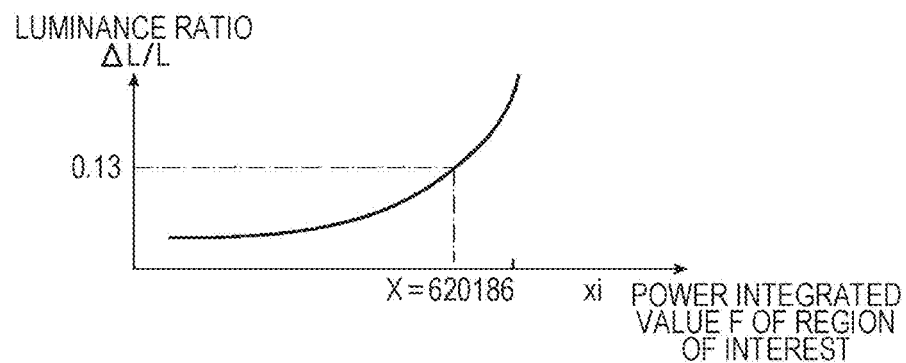
FIG. 15 is a graph illustrating a correlation between an analysis result (power integrated value of draft-image data) and an evaluation value of a density irregularity (luminance ratio) in Example 2 of the present invention.

In accordance with a correlation table in FIG. 15, when X−xi≤0, the probability pi of the conspicuous density irregularity was set to be equal to zero.

In accordance with the correlation table in FIG. 15, when X−xi>0, the probability pi of the conspicuous density irregularity was set to be equal to (X−xi)/X.

With respect to an entire input image, the probability P of the conspicuous density irregularity was represented by the following Formula (1), N representing the number of the whole divided regions of interest.

[Mathematical Formula 2]

$$\Sigma_{i=1}^{N}(pi)/N=P \qquad \text{Formula (1)}$$

(8.4.2) Method for Displaying Message Recommending Inspection

The message recommending the inspection was displayed as similar to Example 1. Note that when the probability P was equal to or more than 0.75, the message recommending the inspection was set to be displayed (YES at Step 1401 in FIG. 14A→NO at Step 1003, Step 1401→Step 1004).

(8.4.3) Method for Determining Correction Value of Developing AC Bias (Conditions)

Table 1 represents a correction table of the peak value (Vpp) of the AC bias. The AC bias is an AC component of developing bias voltage of the image forming apparatus. The higher Vpp indicates that the density irregularity around the sleeve is less conspicuous. In the present image forming apparatus, there are four steps for correcting the peak value (Vpp) of the AC bias. The maximum correction amount M is +300 (Vpp=1180).

The probability of the conspicuous density irregularity is represented by P described in (8.4.1).

TABLE 1

| Correction step | 0 | +1 | +2 | +3 |
|---|---|---|---|---|
| Correction amount [V] | 0 | +100 | +200 | +300 |
| Vpp [V] | 880 | 980 | 1080 | 1180 |
| Remarks | No correction | →→ Advantageous to sleeve-cyclic density irregularity | | |

(Procedures)

As illustrated in FIG. 14B, the input image was analyzed so as to calculate the probability P (Step 1411). When the probability P was less than 0.50, no correction was required (NO at Step 1412→Step 1416). When the probability P was equal to or more than 0.50, a target value of the correction amount of Vpp was set to be M×P (YES at Step 1412→Step 1413), and a correction value closest to M×P was selected from the correction table (Table 1) of Vpp (Step 1414) and Vpp was corrected (Step 1415). Table 2 illustrates some examples obtained herein.

TABLE 2

| Probability P | 0.24 | 0.8 | 0.45 | 0.87 |
|---|---|---|---|---|
| M × P | 72 | 240 | 135 | 261 |
| Correction step | +1 | +2 | +1 | +3 |
| Correction amount [V] | 100 | 200 | 100 | 300 |
| Vpp after correction [V] | 980 | 1080 | 980 | 1180 |

(8.5) Example 3

Example 3 is an example in which the present invention is applied to the following two types of density irregularities which are in trade-off relationship in the electrophotographic image forming apparatus.

Figure 16:
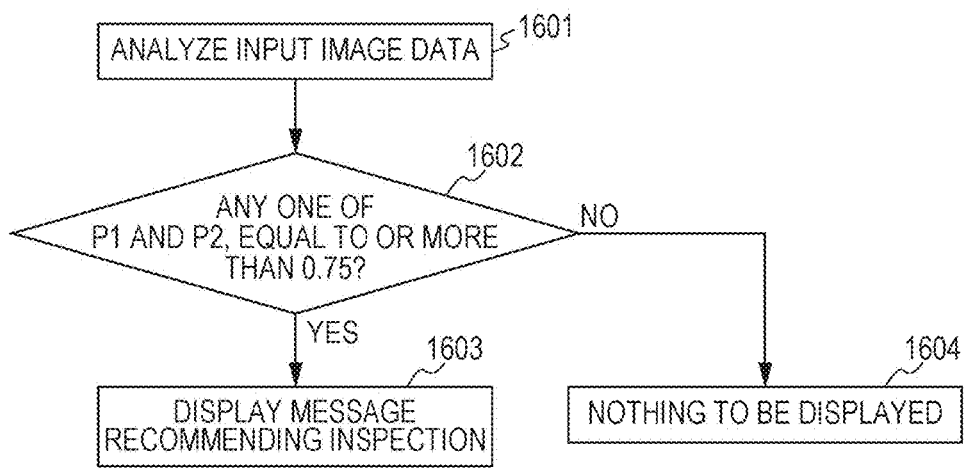
FIG. 16 is a flowchart illustrating an algorithm of displaying the message recommending the inspection according to Example 3 of the present invention.
Figure 17:
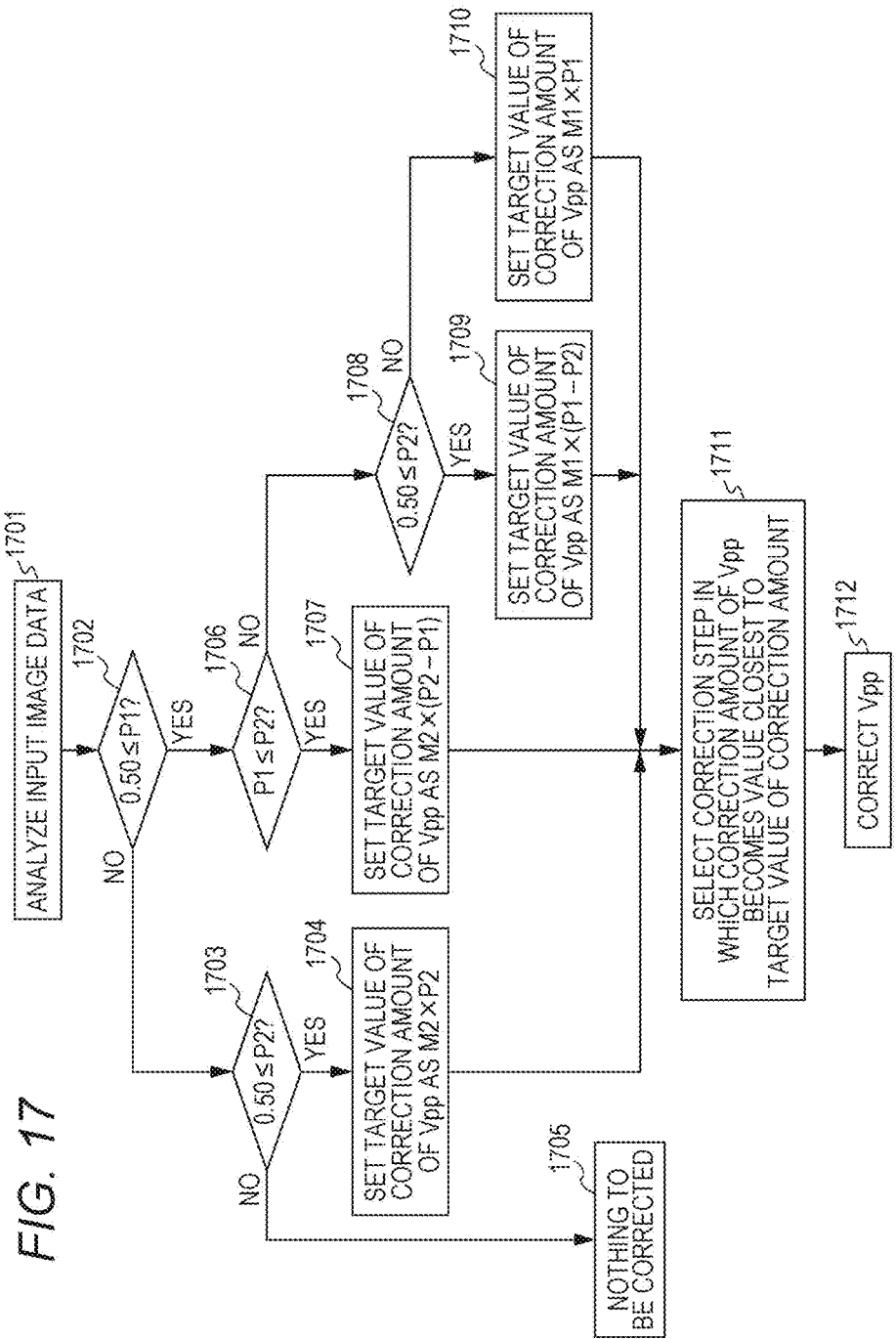
FIG. 17 is a flowchart illustrating an algorithm of correcting developing conditions in accordance with the probability of the conspicuous density irregularity according to Example 3 of the present invention.

An algorithm of displaying the message recommending the inspection adopted in Example 3 is illustrated in FIG. 16. An algorithm of correcting developing conditions in accordance with the probability of the conspicuous density irregularity is illustrated in FIG. 17.

(8.5.1) Definition of Terms

Vpp: the peak value of the developing AC bias

Irregularity 1: a development-cyclic density irregularity which occurs due to deflection of the developing sleeve Irregularity 2: a circular density irregularity referred to as the "firefly" attributing to carrier adhesion P1: an expected probability of a conspicuous irregularity 1

P2: an expected probability of a conspicuous irregularity 2

M1: a correction amount of Vpp when a correction width becomes the largest

M2: the correction amount of Vpp when the correction width becomes the narrowest (8.5.2) Method for Calculating Probability of Conspicuous Density Irregularity A method similar to Example 2 was applied to the irregularity 1 and irregularity 2. Note that sizes of regions of interest adjusted to the two types of the density irregularities to be determined were respectively set to the following values.

Figure 18A:
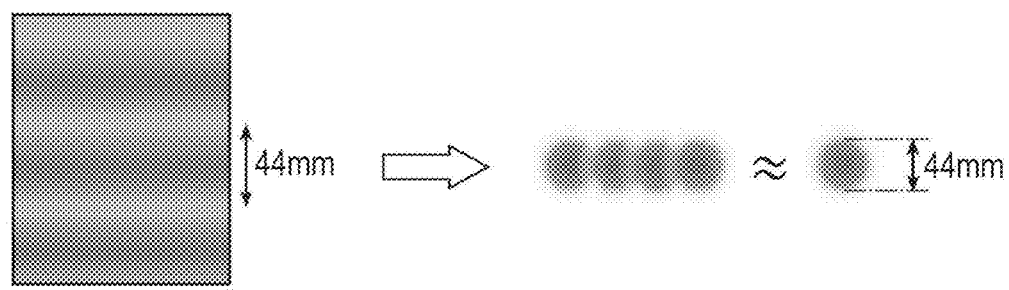
FIG. 18A is a schematic view illustrating that a size of a region of interest corresponding to a belt-like irregularity is set in Example 3 of the present invention.
Figure 18B:
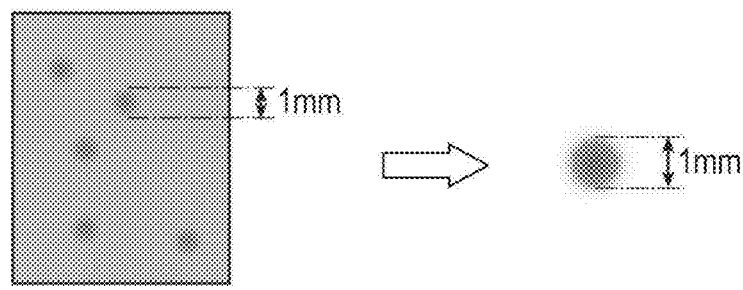
FIG. 18B is a schematic view illustrating that a size of a region of interest corresponding to a circular irregularity is set.

In other words, a side of a region of interest (square) was set to be 44 mm in regard to the irregularity 1, while it was set to be 1 mm in regard to the irregularity 2. The former irregularity was based on that a cycle of an irregularity occurring in a belt-like shape was 44 mm as illustrated in FIG. 18A, while the latter was based on that a diameter of an irregularity occurring in a circular shape was 1 mm as illustrated in FIG. 18B.

Input image data was analyzed so as to calculate the probability P1 and probability P2 (Step 1601, 1701).

(8.5.3) Method for Displaying Message Recommending Inspection

The message recommending the inspection was displayed as similar to Example 1. Note that the message recommending the inspection was set to be displayed when one of the probability P1 and probability P2 was equal to or more than 0.75 (YES in Step 1602 of FIG. 16→Step 1603, NO in Step 1602→Step 1604).

(8.5.4) Method for Determining Correction Value of Developing AC Bias (Conditions)

Table 3 represents a correction table of the peak value (Vpp) of the AC bias. M1 and M2 were respectively set to be equal to 300 [V] and −300 [V]. The higher Vpp makes the irregularity 1 inconspicuous, while the lower Vpp makes the irregularity 2 inconspicuous. They are in the trade-off relationship. Herein, as illustrated in the following procedures (algorithm in FIG. 17), priority was given to a density irregularity having a high probability of the conspicuous density irregularity and correction of the conditions of the image forming processing were instructed.

TABLE 3

| Correction step | −3 | −2 | −1 | 0 | +1 | +2 | +3 |
|---|---|---|---|---|---|---|---|
| Correction amount [V] | −300 | −200 | −100 | 0 | +100 | +200 | +300 |
| Vpp [V] | 580 | 680 | 780 | 880 | 980 | 1080 | 1180 |
| Remarks | Advantageous to carrier adhesion ←← | | | No correction | →→ Advantageous to sleeve-cyclic density irregularity | | |

(Procedures)

The expected probability of the conspicuous irregularity 1 was calculated by a method similar to Example 1 and was referred to as P1.

The expected probability of the conspicuous irregularity 2 was calculated by a method similar to Example 1 except that a size of each region of interest was set to be a square having a side of 1 mm when dividing an input image and was referred to as P2.

In accordance with a flowchart illustrated in FIG. 17, a target value of the correction amount of Vpp was determined and a correction step was selected so that the target value became a correction amount closest to the target value.

In other words, the input image was analyzed and probability P1 and probability P2 were calculated as illustrated in FIG. 17 (Step 1701). When the probability P1 was less than 0.50 (NO in Step 1702) and also when the probability P2 was less than 0.50, no correction was required (NO in Step 1703→Step 1705). When the probability P1 was less than 0.50 (NO in Step 1702) and when the probability P2 was equal to or more than 0.50, the target value of the correction amount of Vpp was set to be M2×P2 (YES in Step 1703→Step 1704). When the probability P1 was equal to or more than 0.50 (YES in Step 1702) and when the probability P2 was equal to or more than the probability P1, the target value of the correction amount of Vpp was set to be M2×(P2−P1) (YES in Step 1706→Step 1707). When the probability P1 was equal to or more than 0.50 (YES in Step 1702) and when the probability P2 was less than the probability P1 and the probability P2 was also equal to or more than 0.50, the target value of the correction amount of Vpp was set to be M1×(P1−P2) (NO in Step 1706→YES in Step 1708→Step 1709). When the probability P1 was equal to or more than 0.50 (YES in Step 1702) and when the probability P2 was less than the probability P1 and the probability P2 was less than 0.50, the target value of the correction amount of Vpp was set to be M1×P1 (NO in Step 1706→NO in Step 1708→Step 1710).

After determination of each target value, the correction value closest to the target value among the correction table of Vpp (Table 3) was selected (Step 1711) and Vpp was corrected (Step 1712). Table 4 illustrates some examples obtained herein.

As mentioned above, when both of the probability P1 and probability P2 were less than 0.50, no correction was required. However, those equal to or more than 0.50 required to be corrected. When both of the probability P1 and probability P2 were equal to or more than 0.50, in order not to extremely emphasize the irregularity having comparatively low probability, the target value was set so as to make a difference of the probability, for example, as M2×(P2−P1) in Step 1706 and M1×(P1−P2) in Step 1708.

TABLE 4

|  | Example 1 | Example 2 | Example 3 | Example 4 | Example 5 |
|---|---|---|---|---|---|
| P1 | 0.61 | 0.78 | 0.95 | 0.45 | 0.24 |
| P2 | 0.80 | 0.59 | 0.31 | 0.55 | 0.28 |
| Target value of correction amount (Formula) | M2 × (P2 − P1) | M1 × (P1 − P2) | M1 × P1 | M2 × P2 | N/A |
| Target value of correction amount [V] | −57 | 57 | 285 | −165 | 0 |
| Correction step | −1 | +1 | +3 | −2 | 0 |
| Correction amount [V] | −100 | +100 | +300 | −200 | 0 |
| Vpp after correction [V] | 780 | 980 | 1180 | 680 | 880 |

(8.6) Comparative Example 1

On the contrary to the abovementioned Examples, an electrophotographic image forming apparatus without involving the system for predicting occurrence of the defective images (performance of the system for predicting occurrence of the defective images was turned off) was operated as Comparative Example 1, and the following comparative evaluation was carried out.

(8.6.1) Evaluation 1

A time required from input of image data according to printing jobs to completion of inspection was compared among Examples 1 to 3 and Comparative Example 1.

(Conditions)

Inspection was manually carried out on printed materials on which the message recommending the inspection was displayed.

The following is a common operation condition of the image forming apparatus.

Linear velocity was set to be 100 ppm (velocity excluding a time required for adjusting and stabilizing an image).

In regard to contents of the printing jobs, see Table 5.

TABLE 5

|  | Job 1 | Job 2 | Job 3 |
|---|---|---|---|
| Size | A4 | A3 | Postcard |
| Number of pages | 5 | 5 | 2000 |
| Number of copies | 2000 | 2000 | 5 |

(Results)

Figure 19:
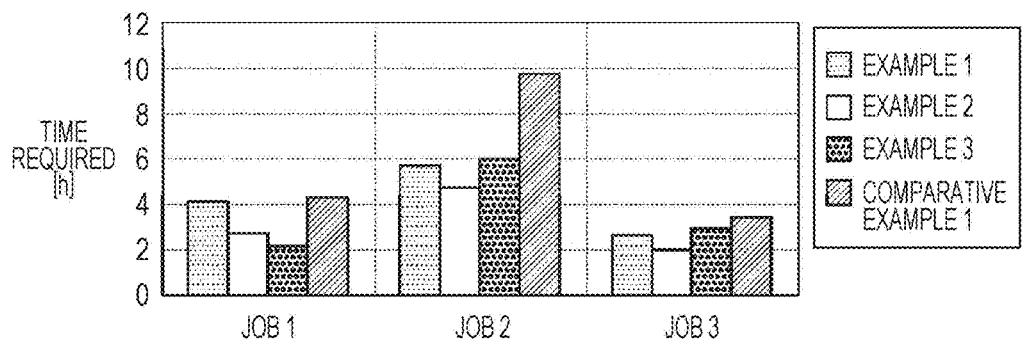
FIG. 19 is a graph for comparing a time required from printing to inspection in regard to Examples 1 to 3 and Comparative Example 1 of the present invention.

A graph illustrated in FIG. 19 represents the time required for printing and inspection.

All the Examples 1 to 3 required the time shorter than Comparative Example 1.

In Example 1, the number of materials to be inspected were larger than in Examples 2 and 3 and a difference between Comparative Example 1 was small in Job 1, in which an A4-size sheet was used. However, the time required could be diminished in all Jobs comparing with Comparative Example 1.

In Example 3, a time required for calculation in the system for predicting occurrence of the defective images was the longest so that a difference between Comparative Example 1 was small in Job 3, in which many types of drafts (the large number of pages) were used. However, the time required could be diminished in all Jobs comparing with Comparative Example 1.

In Job 2, in which a large A3-size sheet was used, the time required could be diminished remarkably in each Example comparing with Comparative Example 1.

(8.7) Example 4

Similar to Example 1, Example 4 is an example in which the present invention is applied to a development-cyclic density irregularity which occurs due to deflection of the developing sleeve in the electrophotographic image forming apparatus.

The image forming apparatus includes the density-irregularity detection system which reads out the density difference from each formed image. The image forming apparatus further detects and excludes the density irregularity.

Figure 20:
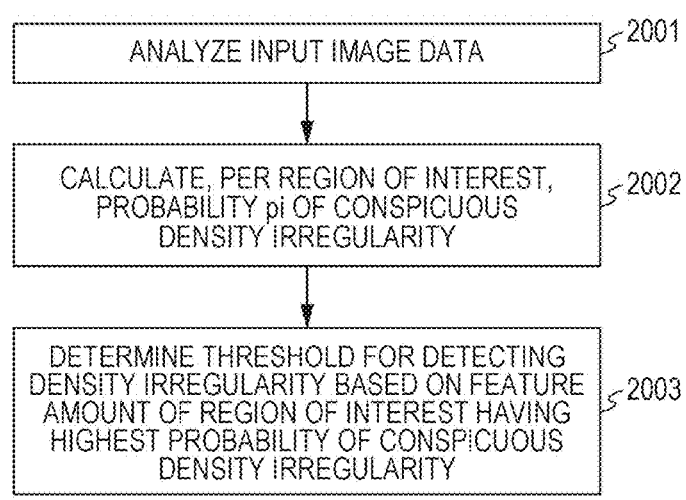
FIG. 20 is a flowchart illustrating an algorithm of setting a threshold for detecting density irregularity in accordance with input image data according to Example 4 of the present invention.

FIG. 20 illustrates an algorithm of setting a threshold of the density difference for determining the density irregularity by the density-irregularity detection system in accordance with input image data.

(8.7.1) Method for Calculating Expected Probability of Conspicuous Density Irregularity Applying a method similar to Example 2, the image data input as a draft was divided to be analyzed per region of interest so as to obtain the expected probability pi of the i-th region of interest (Step 2001, 2002).

(8.7.2) Method for Determining Threshold of Density Difference for Determining Density Irregularity A region of interest I having the largest pi was selected per image data input as a draft.

Figure 21:
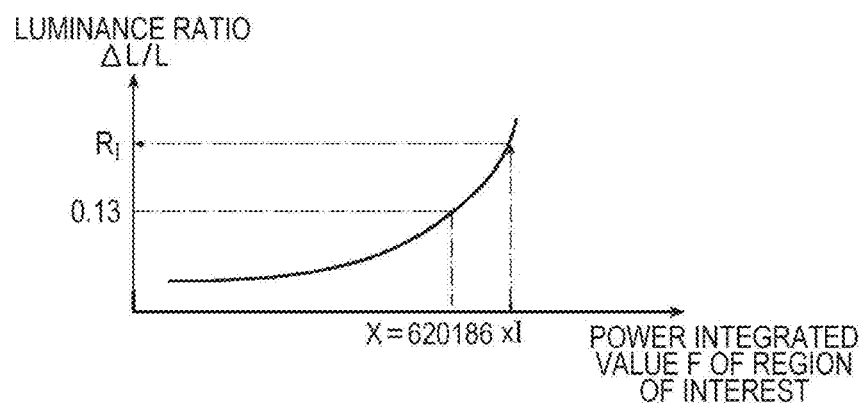
FIG. 21 is a graph illustrating correlation between an analysis result (power integrated value of draft-image data) and an evaluation value of a density irregularity (luminance ratio) in Example 4 of the present invention.

Based on a correlation view between the luminance ratio $\Delta L/L$ of the density irregularity and power integrated value F of the region of interest illustrated in FIG. 21, when the density irregularity to be determined (in this Example, the development-cyclic density irregularity) occurs in the region of interest I, calculated was a luminance ratio RI of the irregularity at the minimum value in which the irregularity was visible.

By the method described in (8.3), the luminance ratio RI was converted into a density difference DI. DI was referred to as the threshold of the density difference for determining the density irregularity by the density-irregularity detection system (Step 2003).

In place of the minimum value, other statistics such as a mean value and maximum value may be applicable.

(8.8) Comparative Example 2

On contrary to the abovementioned Example 4, the electrophotographic image forming apparatus without involving the system for predicting occurrence of the defective images (performance of the system for predicting occurrence of the defective images was turned off) was operated as Comparative Example 2, and the following comparative evaluation was carried out.

The luminance ratio which was to be the threshold for detecting the density irregularity was fixed to 0.13.

(8.8.1) Evaluation 2

In Example 4 and Comparative Example 2, printed materials which had gone through an automatic inspection by the density-irregularity detection system and printed materials excluded as including the density irregularity were all visually observed so as to evaluate whether the density irregularity was conspicuous. Accordingly, accuracy of inspecting the defective images was evaluated.

(Conditions)

Inspection was carried out by the density-irregularity detection system.

In regard to contents of a printing job, the number of drafts was set to be 5000 and one copy of one draft was printed on an A3-size sheet.

In regard to determination whether the irregularity was conspicuous, when the determination differs between the automatic inspection by the density-irregularity detection system and the visual evaluation by a human being, the determination obtained by the automatic inspection was considered to be an error.

(Procedures)

With respect to the accepted printed materials and the printed materials excluded by the automatic inspection carried out by the density-irregularity detection system, a rate of incorrect determination of inspecting the density irregularity was calculated and estimated by the following Formula.

In other words, a rate of incorrect determination of rejected images was represented by B/A×100 (%), A representing a total number of printed materials excluded by the automatic inspection, and B representing the number of images whose density irregularity was determined to be inconspicuous by the visual observation among the total printed materials.

Furthermore, a rate of incorrect determination of accepted images was represented by B1/A1×100 (%), A1 representing a total number of printed materials accepted by the automatic inspection, and B1 representing the number of images whose the density irregularity was determined to be conspicuous among the total printed materials.

(Results)

Table 6 illustrates evaluation results.

In Example 4, comparing with Comparative Example 2, the rate of the incorrect determination of the rejected images and the rate of the incorrect determination of the accepted images were diminished as illustrated in Table 6.

TABLE 6

| | | Example 4 | Comparative Example 2 |
|---|---|---|---|
| Output images excluded by automatic inspection | Total (A) | 1100 | 950 |
| | Number of images with inconspicuous irregularity (B) | 13 | 171 |
| | Rate of incorrect determination of rejected images (B/A) [%] | 1 | 18 |
| Output images accepted by automatic inspection | Total (A1) | 3900 | 4050 |
| | Number of images with conspicuous irregularity (B1) | 0 | 137 |
| | Rate of incorrect determination of accepted images (B1/A1) [%] | 0 | 3 |

(8.9) A Method for Making the Correlation Table (Formula) Between the Impression Rank and Value F will Be Hereinafter Described (8.9.1) How to Obtain Impression Rank Under the following conditions, an image having a dotted density irregularity was presented to the subjects. Each subject was asked to report the conspicuity of the density irregularity with using the "impression rank."

(Conditions)

Experimental environment where the image was presented: in a light booth

Output device: PX-H10000 made by Seiko Epson Corp.

Applicable controller: Falbard AQUA system

Output sheet: FA Proof coat (in presenting the image, a test image was put on overlapping four pieces of J paper as an underlay)

Image size: 300 mm×300 mm

Color: Full color

Type of a background image: natural-scene image Shape of the density irregularity: circular shape in which gradient distribution was changed in accordance with the Gaussian distribution Size of the density irregularity was set to be within a range of a visual field at approximately 1° of each observer.

Figure 22A:
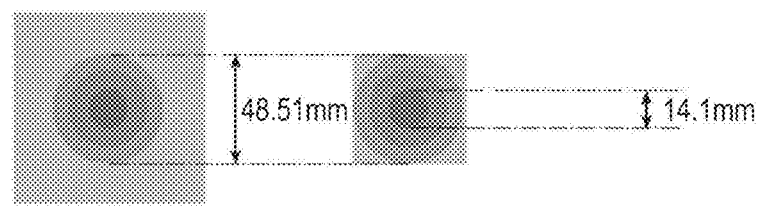
FIG. 22A is a schematic view of a circular irregularity used for making the correlation table (formula) of the impression rank and value F applicable to an embodiment the present invention.

Herein, a target was a circular irregularity in accordance with the Gaussian distribution in which a width of a region where the gradient changed as illustrated in FIG. 22A was set to be 48.51 mm, and a width of a central portion was set to be 14.1 mm.

(Procedures)

Figure 23A:
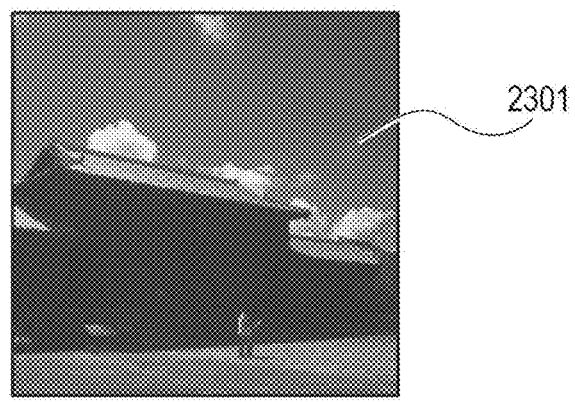
FIG. 23A is an exemplary presentation image used for making the correlation table (formula) of the impression rank and value F applicable to an embodiment the present invention.

FIG. 23A illustrates an exemplary presentation image. The presentation image having a circular density irregularity 2301 as illustrated in FIG. 23A was presented to the subjects. Each subject was asked to report the conspicuity of the density irregularity with using the "impression rank." The impression rank herein conformed to one described in (5.4).

(8.9.2) Analysis of Frequency

On the other hand, the following analysis was carried out with respect to a frequency of the density irregularity described in (8.9.1).

Figure 22B:
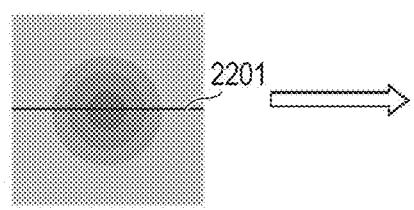
FIG. 22B is a view illustrating a reference line of a brightness profile.
Figure 22C:
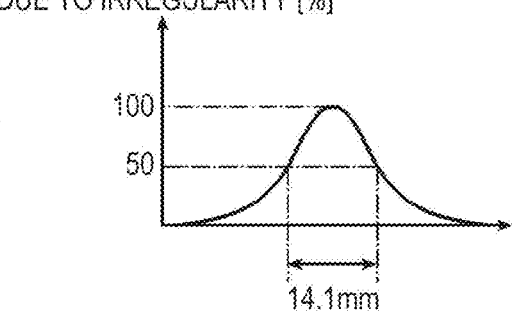
FIG. 22C is a view illustrating the brightness profile.

A brightness profile on a center line 2201 illustrated in FIG. 22B was obtained as illustrated in FIG. 22C. The central portion of the density irregularity was set to be a range in which variation of brightness was at a constant level or more.

Figure 23B:
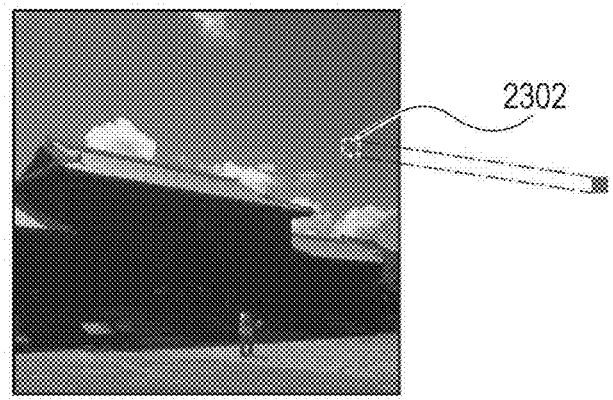
FIG. 23B is a view illustrating that a region where a circular irregularity occurs is cut off from the presentation image.

A region 2302 (14.1 mm×14.1 mm) where the central portion of the irregularity was drawn was cut off from input data (draft data) having no irregularity as illustrated in FIG. 23B.

Figure 24A:
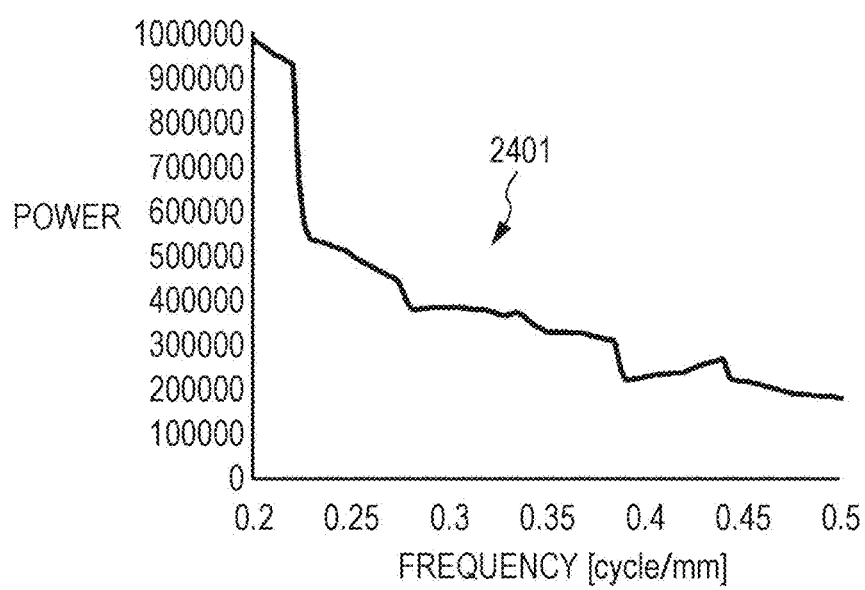
FIGS. 24A and 24B are views each illustrating a power spectrum of a spatial frequency of gradient distribution obtained by carrying out two-dimensional Fourier transform on the image cut off in FIG. 23B, where

The cutoff image was subject to the two-dimensional Fourier transform so as to obtain a power spectrum 2401 of the spatial frequency of the gradient distribution. FIG. 24A is a schematic view of the power spectrum to be obtained.

Figure 24B:
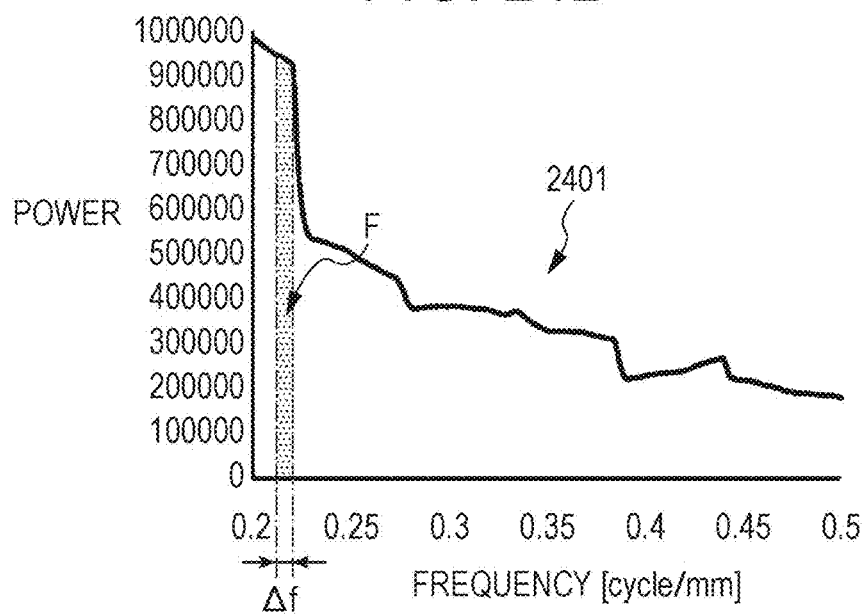

A range in which the frequency is from $\{(1/14.1)\times 3\}=0.213$ to $\{(1/14.1)\times 3\}=0.220$ is represented by $\Delta f$ as illustrated in FIG. 24B, and a value obtained by integrating the power spectrum 2401 by the range of $\Delta f$ is represented by F.

Herein, the value $\{(1/14.1)\times 3\}$ was obtained by selecting a range except for the DC component in the power spectrum 2401 with reference to the size of the density irregularity. Furthermore, the value was obtained when the correlation between the impression rank was especially satisfactory.

The present Example has described a case where the power was integrated as setting the range of $\Delta f$. However, without integrating the power, the power when the frequency is $\{(1/14.1)\times 3\}=0.213$ may be applied as the value F.

(8.9.3) How to Obtain Luminance Ratio of Density Irregularity

In regard to the density irregularity described in (8.9.1), obtained was a value obtained by converting the density difference between the central and vicinal portions into the luminance ratio. An example of a method to obtain such a value is to measure the brightness profile when the density irregularity occurs on an image having uniform density, and to determine a width of a central portion 2501 of the density irregularity as illustrated in FIGS. 25A and 25B.

Figure 25A:
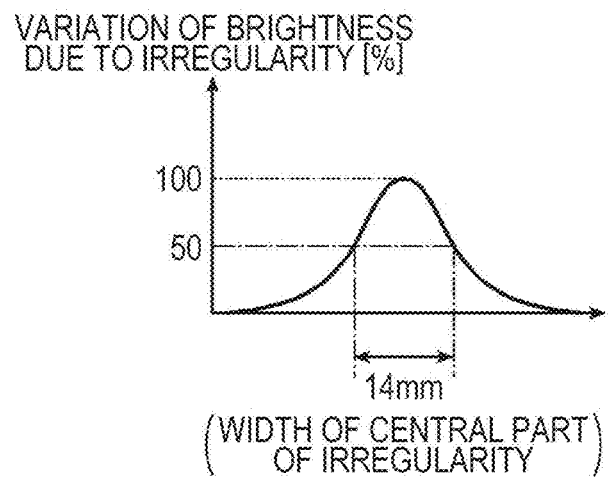
FIG. 25A is a brightness profile for determining a central portion and vicinal portion of the circular irregularity illustrated in FIG. 22A.
Figure 25B:
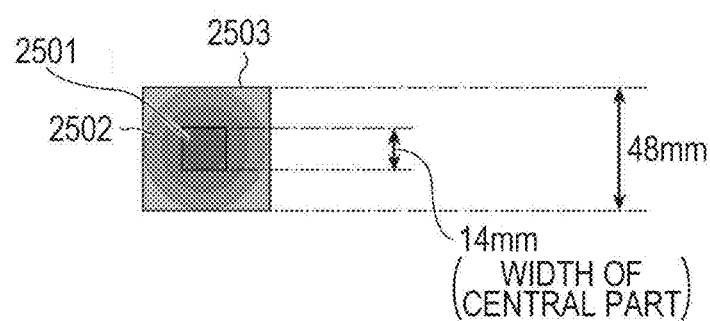
FIG. 25B is a schematic view of the circular irregularity illustrating the central portion and vicinal portion thereof.

As illustrated in FIGS. 25A and 25B, a region in which a square 2501, or the central portion, was excluded from a square 2503 was referred to as a vicinal portion 2502. The square has a size of 48 mm×48 mm, sharing a center with the density irregularity.

The density of both central portion 2501 and vicinal portion 2502 was measured so as to obtain a difference between those two. The obtained difference was converted into the luminance ratio in accordance with the conversion method described in (8.3).

(8.9.4) Correlation Formula to be Obtained

Figure 26:
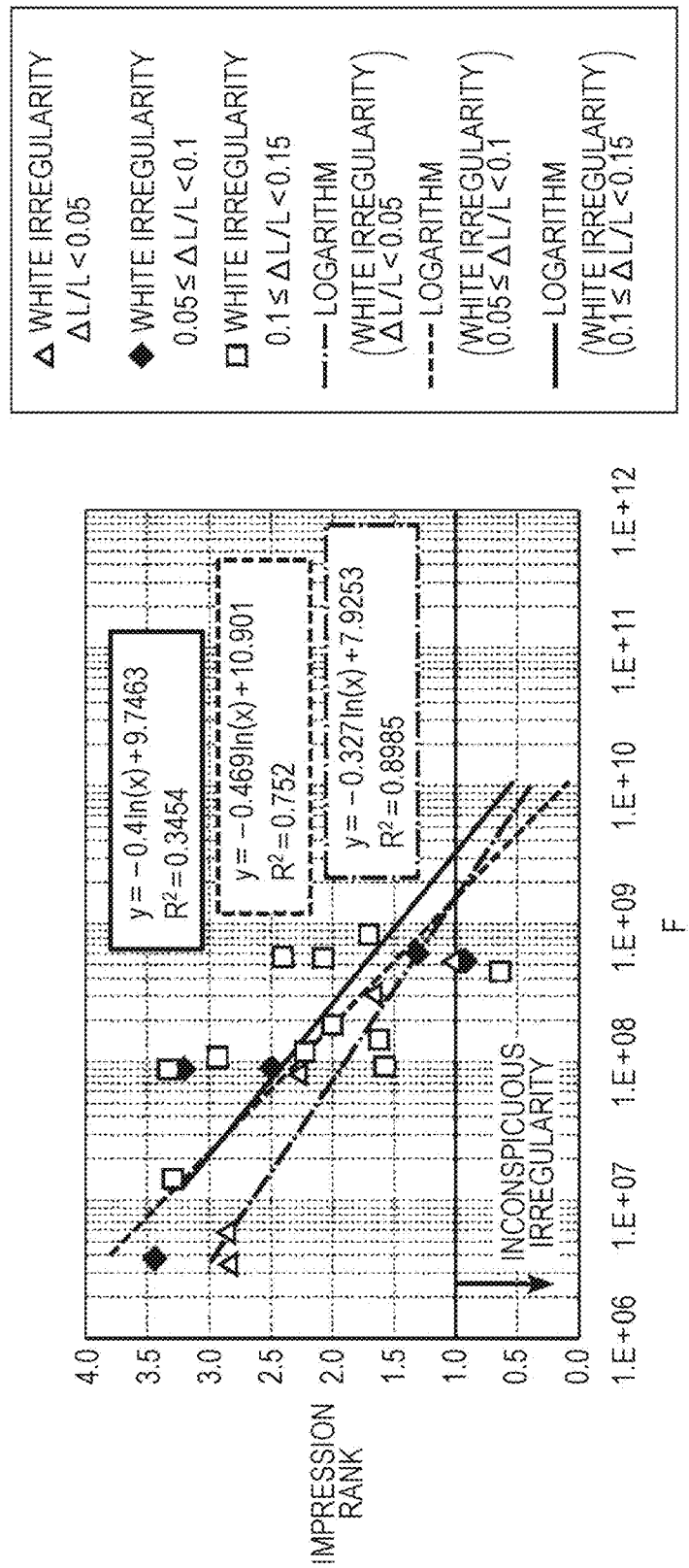
FIG. 26 is a view illustrating correlation between the value F of each presentation image used in the experiment and the impression rank obtained from subjects.

According to the abovementioned procedures from (8.9.1) to (8.9.3), the value F was calculated per presentation image used for the experiment and the correlation view was drawn as illustrated in FIG. 26 with using the "impression rank" obtained from the subjects.

Herein, $\Delta L/L$ was separated based on a predetermined range so as to draw a correlation view per separated $\Delta L/L$.

In the present Example, the obtained correlation formula R' (F) between the impression rank and value F is represented by the following three formulae per range of $\Delta L/L$.

When (i) $\Delta L/L<0.05$, (impression rank)=$-0.327$ ln (F)+7.9253.

When (ii) $0.05<\Delta L/L<0.1$, (impression rank)=$-0.469$ ln(F)+10.901.

When (iii) $0.1\leq \Delta L/L<0.15$, (impression rank)= $-0.400$ ln(F)+9.7463.

(8.9.5) Example 5

Described in Example 5 is a method for applying the correlation formula R' (F) between the impression rank of (8.9.4) and value F to Example 1.

The image data input to the image forming apparatus in Example 1 was expanded or contracted so that the size 44 mm of the actually-occurring density irregularity became equal to the pixel number of "the image cut off from the input image (a central region of the density irregularity) when analyzing the frequency in order to obtain the correlation formula R' (F)."

By the method of (8.9.2), the value F of each image of interest was obtained.

Figure 27:
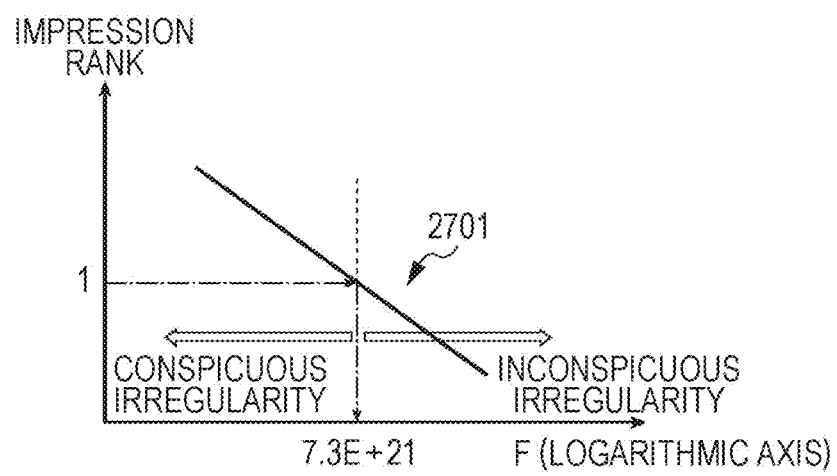
FIG. 27 is a graph illustrating correlation between a value F and impression rank in Example 5 of the present invention.

In Example 1, the luminance ratio $\Delta L/L$ of the density irregularity was 0.13. In this Example, the luminance ratio was within a range of $0.1\leq \Delta L/L<0.15$. Therefore, the correlation formula (iii) among the correlation formulae R' (F) was applicable. As illustrated in FIG. 27, the correlation formula (iii) is represented by a graph 2701.

Supposed that the luminance ratio of the density irregularity is $\Delta L/L<0.05$, the correlation formula (i) is applicable, and when it is $0.05\leq \Delta L/L<0.1$, the formula (ii) is applicable.

When the impression rank was equal to or less than 1, the irregularity was inconspicuous. Therefore, the reference value of the value F located in the border of the conspicuous irregularity and inconspicuous irregularity was set to be $7.3\times 10^{21}$ based on FIG. 27.

In each region of interest, when $7.3\times 10^{21}\leq F$, it was determined that "the irregularity is inconspicuous" and when $F<7.3\times 10^{21}$, it is determined that "the irregularity is conspicuous."

Other procedures were carried out in a manner similar to Example 1.

(8.9.6) Example 6

Described in Example 6 is a method for applying the correlation formula R' (F) between the impression rank of (8.9.4) and value F to Example 2.

Similar to Example 5, the correlation formula (iii) corresponding to the luminance ratio $\Delta L/L=0.13$ of the density irregularity was used so as to obtain $X=7.3\times 10^{21}$.

Other procedures were carried out in a manner similar to Example 2.

According to an embodiment of the present invention, with respect to image data input to an image forming apparatus as a draft, a spatial frequency of gradient distribution of each image is analyzed in accordance with a size of a density irregularity specific to the image forming apparatus, and a probability of a conspicuous density irregularity of the size is calculated in regard to each image formed by the image forming apparatus based on the image data. Such calculation is carried out with reference to an index of correlation between an analysis result and an evaluation value of the density irregularity. As a user refers to the calculated probability, it is possible to diminish trial prints for detecting the density irregularity and to diminish the number of images to be inspected.

Herein, it is possible to instruct correction of conditions of image forming processing based on the "probability of the conspicuous density irregularity" calculated per image data to be input. Therefore, there is an effect that the images can be corrected properly in the image forming apparatus in accordance with a feature of each image. As a result, it is possible to diminish both excessive correction and insufficient correction which may occur in a case of setting a uniform correction amount.

It is possible to output information of setting a threshold for detecting the density irregularity based on the "probability of the conspicuous density irregularity" calculated per image data to be input. Therefore, there is an effect that the detection threshold is set properly in a density-irregularity detection system in accordance with the feature of each image. As a result, it is possible to diminish disposal of non-defective materials and failure to detect defective materials which may occur in a case of setting a uniform detection threshold.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A system for predicting occurrence of a defective image, comprising:
   an input device configured to input image data into an image forming apparatus; and
   a hardware processor configured to analyze a spatial frequency of gradient distribution of an image in accordance with a size of a density irregularity specific to the image forming apparatus with respect to the input image data and to calculate a probability of a conspicuous density irregularity of the size in regard to the image formed by the image forming apparatus based on the image data with reference to a subjective evaluation using an index of correlation between an analysis result and a reference value of the density irregularity specific to the image forming apparatus.

2. The system for predicting occurrence of a defective image according to claim 1, wherein, in analyzing the spatial frequency of the gradient distribution of the image in accordance with the size of the density irregularity specific to the image forming apparatus, the hardware processor
   (1) replaces the density irregularity with circular gradient distribution according to two-dimensional Gaussian distribution and having a diameter equal to one cycle of the density irregularity,
   (2) carries out Fourier transform on image data, the image data being drawn with the Gaussian distribution of (1), so as to obtain a power spectrum of the spatial frequency of the circular gradient distribution,
   (3) extracts a frequency band ranging from where power is at a peak to where the power is at a predetermined value within the power spectrum of (2) except for a DC component or extracts the frequency at a peak, and
   (4) divides the image data to make regions of interest, each having a size fitting the Gaussian distribution of (1), calculates the power spectrum of the spatial frequency of gradient distribution by carrying out the Fourier transform on the whole divided regions of interest, and obtains the analysis result as a value F obtained by integrating the power by the frequency band extracted in (3) or a value F of the power at the frequency extracted in (3).

3. The system for predicting occurrence of a defective image according to claim 2, wherein the hardware processor calculates a luminance ratio $\Delta L/L$ corresponding to the value F per divided region of interest and gives feedback to a density-irregularity detection system that detects the density irregularity relating to the image formed by the image forming apparatus.

4. The system for predicting occurrence of a defective image according to claim 2, wherein the hardware processor calculates a luminance ratio $\Delta L/L$ corresponding to the value F per divided region of interest and imparts, as an inspection threshold of the density irregularity, statistics such as a minimum value, mean value, and maximum value of a density difference corresponding to the luminance ratio $\Delta L/L$ to a density-irregularity detection system that detects the density irregularity relating to the image formed by the image forming apparatus.

5. The system for predicting occurrence of a defective image according to claim 2, wherein the hardware processor (5) determines that the density irregularity is inconspicuous when the value F of each region of interest in (4) is larger than the predetermined reference value, and
   (6) calculates the probability of the conspicuous density irregularity in the image formed by the image forming apparatus based on the image data by combining the determination of (5) in regard to each region of interest.

6. The system for predicting occurrence of a defective image according to claim 5, wherein the hardware processor sets n/N as a probability P of the conspicuous density irregularity in the image formed by the image forming apparatus based on the image data, where N is a total number of the regions of interest, and n is the number of regions of interest whose density irregularity is determined to be conspicuous.

7. The system for predicting occurrence of a defective image according to claim 5, wherein the hardware processor sets a mean value of pi of a total number N as the probability of the conspicuous density irregularity in the image formed by the image forming apparatus based on the image data, where N is the total number of the regions of interest, and pi is an expected probability of a conspicuous irregularity to be determined, the probability being set to pi=0 upon X−xi≤0 and pi=(X−xi)/X upon X−xi>0, where X is the reference value, and xi is the value F of an i-th region of interest.

8. The system for predicting occurrence of a defective image according to claim 1, wherein the hardware processor displays a message recommending an inspection to a user upon determining the probability of the conspicuous density irregularity as being equal to or higher than a predetermined value.

9. The system for predicting occurrence of a defective image according to claim 1, wherein the hardware processor instructs an image forming unit included in the image forming apparatus to correct a condition of image forming processing in order to diminish the density irregularity upon determining the probability of the conspicuous density irregularity as being equal to or higher than a predetermined value.

10. The system for predicting occurrence of a defective image according to claim 9, wherein the hardware processor sets a correction amount of the condition of the image forming processing, instructed to the image forming unit, as a value closest to M×P among settable values, where P is the probability of the conspicuous density irregularity, and M is a maximum correction amount.

11. The system for predicting occurrence of a defective image according to claim 1, wherein, with respect to a plurality of density irregularities having different sizes, the hardware processor analyzes the spatial frequency of the gradient distribution of the image in accordance with a size of each density irregularity and calculates each probability of the conspicuous density irregularity.

12. The system for predicting occurrence of a defective image according to claim 11, wherein, in instructing the image forming unit in the image forming apparatus to correct the condition of the image forming processing in order to diminish the density irregularities based on each probability of the conspicuous density irregularity, the hardware processor gives priority to a density irregularity having a high probability of the conspicuous density irregularity among the plurality of density irregularities so as to instruct to correct the condition of the image forming processing.

13. The system for predicting occurrence of a defective image according to claim 1, wherein the hardware processor outputs information of setting an inspection threshold of the density irregularity in accordance with the probability of the conspicuous density irregularity with respect to a density-irregularity detection system that detects the density irregularity relating to the image formed by the image forming apparatus.

14. A non-transitory recording medium storing a computer readable program of a hardware processor included in an image forming apparatus, the program causing a computer to execute:
  analyzing a spatial frequency of gradient distribution of an image in accordance with a size of a density irregularity specific to the image forming apparatus with respect to input image data; and
  calculating a probability of a conspicuous density irregularity of the size in regard to the image formed by the image forming apparatus based on the image data with reference to a subjective evaluation using an index of correlation between an analysis result and a reference value of the density irregularity specific to the image forming apparatus.

15. The non-transitory recording medium storing a computer readable program according to claim 14, the program causing the computer to further execute, in analyzing the spatial frequency of the gradient distribution of the image in accordance with the size of the density irregularity specific to the image forming apparatus:
  (1) replacing the density irregularity with circular gradient distribution according to two-dimensional Gaussian distribution and having a diameter equal to one cycle of the density irregularity;
  (2) carrying out Fourier transform on image data, the image data being drawn with the Gaussian distribution of (1), so as to obtain a power spectrum of the spatial frequency of the circular gradient distribution;
  (3) extracting a frequency band ranging from where power is at a peak to where the power is at a predetermined value within the power spectrum of (2) except for a DC component or extracting the frequency at a peak; and
  (4) dividing the image data to make regions of interest, each having a size fitting the Gaussian distribution of (1), calculating the power spectrum of the spatial frequency of the gradient distribution by carrying out the Fourier transform on the whole divided regions of interest, and obtaining the analysis result as a value F obtained by integrating the power by the frequency band extracted in (3) or a value F of the power at the frequency extracted in (3).

16. The non-transitory recording medium storing a computer readable program according to claim 15, the program causing the computer to further execute:
  (5) determining that the density irregularity is inconspicuous when the value F of each region of interest in (4) is larger than the predetermined reference value; and
  (6) calculating the probability of the conspicuous density irregularity in the image formed by the image forming apparatus based on the image data by combining the determination of (5) in regard to each region of interest.

17. The non-transitory recording medium storing a computer readable program according to claim 16, the program causing the computer to further execute setting n/N as a probability P of the conspicuous density irregularity in the image formed by the image forming apparatus based on the image data, where N is a total number of the regions of interest, and n is the number of regions of interest whose density irregularity is determined to be conspicuous.

18. The non-transitory recording medium storing a computer readable program according to claim 16, the program causing the computer to further execute setting a mean value of pi of a total number N as the probability of the conspicuous density irregularity in the image formed by the image forming apparatus based on the image data, where N is the total number of the regions of interest, and pi is an expected probability of a conspicuous irregularity to be determined, the probability being set to pi=0 upon X−xi≤0 and pi=(X−xi)/X upon X−xi>0, where X is the reference value, and xi is the value F of an i-th region of interest.

19. The non-transitory recording medium storing a computer readable program according to claim 14, the program causing the computer to further execute instructing to display a message recommending an inspection to a user upon determining the probability of the conspicuous density irregularity as being equal to or higher than a predetermined value.

20. The non-transitory recording medium storing a computer readable program according to claim 14, the program causing the computer to further execute instructing an image forming unit included in the image forming apparatus to correct a condition of image forming processing in order to diminish the density irregularity upon determining the probability of the conspicuous density irregularity as being equal to or higher than a predetermined value.

* * * * *